(12) United States Patent
Lin et al.

(10) Patent No.: US 10,247,924 B2
(45) Date of Patent: Apr. 2, 2019

(54) IMAGING OPTICAL LENS SYSTEM, IMAGE CAPTURING APPARATUS AND ELECTRONIC DEVICE

(71) Applicant: LARGAN PRECISION CO., LTD., Taichung (TW)

(72) Inventors: Cheng-Chen Lin, Taichung (TW); Chun-Yen Chen, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/974,005

(22) Filed: May 8, 2018

(65) Prior Publication Data

US 2018/0259747 A1    Sep. 13, 2018

Related U.S. Application Data

(63) Continuation of application No. 15/454,007, filed on Mar. 9, 2017, now Pat. No. 10,073,251.

(30) Foreign Application Priority Data

Sep. 12, 2016  (TW) .............................. 105129623 A

(51) Int. Cl.
G02B 13/00   (2006.01)
G02B 5/20    (2006.01)
G02B 9/62    (2006.01)

(52) U.S. Cl.
CPC .......... *G02B 13/0045* (2013.01); *G02B 5/208* (2013.01); *G02B 9/62* (2013.01)

(58) Field of Classification Search
CPC ....... G02B 13/0045; G02B 5/208; G02B 9/62
See application file for complete search history.

(56) References Cited

U.S. PATENT DOCUMENTS

| | | |
|---|---|---|
| 8,891,177 B2 | 11/2014 | Huang |
| 9,019,626 B2 | 4/2015 | Hsieh et al. |
| 9,316,811 B2 | 4/2016 | Chen |
| 2012/0212842 A1 | 8/2012 | Hosoi et al. |
| 2016/0341934 A1 | 11/2016 | Mercado |

FOREIGN PATENT DOCUMENTS

| | | |
|---|---|---|
| CN | 105807391 A | 7/2016 |
| JP | 2014-010399 A | 1/2014 |
| WO | 2016/109956 A1 | 7/2016 |

*Primary Examiner* — Jack Dinh
(74) *Attorney, Agent, or Firm* — McClure, Qualey & Rodack, LLP

(57) ABSTRACT

An imaging optical lens system includes six lens elements, the six lens elements being, in order from an object side to an image side, a first lens element, a second lens element, a third lens element, a fourth lens element, a fifth lens element and a sixth lens element. The first lens element has positive refractive power. The third lens element has an image-side surface being concave in a paraxial region thereof. The fifth lens element has an object-side surface and an image-side surface being both aspheric. The sixth lens element has an image-side surface being concave in a paraxial region thereof, wherein an object-side surface and the image-side surface of the sixth lens element are both aspheric, and the image-side surface of the sixth lens element includes at least one convex critical point in an off-axial region thereof.

25 Claims, 33 Drawing Sheets

IMAGING OPTICAL LENS SYSTEM, IMAGE CAPTURING APPARATUS AND ELECTRONIC DEVICE

RELATED APPLICATIONS

The present application is a continuation of U.S. application Ser. No. 15/454,007, filed Mar. 9, 2017, the entire contents of which are hereby incorporated herein by reference, which claims priority to Taiwan Application Serial Number 105129623, filed Sep. 12, 2016, which are herein incorporated by reference.

BACKGROUND

Technical Field

The present disclosure relates to an imaging optical lens system and an image capturing apparatus. More particularly, the present disclosure relates to a compact imaging optical lens system and an image capturing apparatus which are applicable to electronic devices.

Description of Related Art

With the popularity of smart electronic devices and recent technology advances, requirements for photographing functions of these devices from most users are now even more demanding. In order to take pictures with a depth of field effect or lower noise level at night, smart electronic devices should be equipped with high resolution imaging optical lens systems with large apertures. However, the volume of these imaging optical lens systems and their aperture sizes are often limited by the compact design of smart electronic devices, and it results in failing to optically adjust depth of focus, digital focusing inaccuracy and etc. Hence, there is a need for mechanical devices capable of adjusting aperture sizes to overcome these shortages.

However, conventional imaging optical lens systems applied to smart electronic devices usually have the configurations of short total track lengths, so that the axial distances between lens elements are too small to insert elements like shutters, MEMS (Microelectromechanical Systems), filters, spacers and so on between thereof. In addition, the imaging optical lens system is also configured with a front stop due to the limitation of the total track length and chief ray angle (CRA). It makes elements such as the shutter to be located in the front end of the imaging optical lens system, the position closest to an imaged object, vulnerable from outside physical abuses.

Therefore, the photographing functions of conventional imaging optical lens systems are limited by the smaller axial distances between lens elements, so there is an urgent need in developing a high quality imaging optical lens system with characteristics of both compact size and greater axial distances between lens elements.

SUMMARY

According to one aspect of the present disclosure, an imaging optical lens system includes six lens elements, the six lens elements being, in order from an object side to an image side, a first lens element, a second lens element, a third lens element, a fourth lens element, a fifth lens element and a sixth lens element. The first lens element has positive refractive power. The third lens element has an image-side surface being concave in a paraxial region thereof. The fifth lens element has an object-side surface and an image-side surface being both aspheric. The sixth lens element has an image-side surface being concave in a paraxial region thereof, wherein an object-side surface and the image-side surface of the sixth lens element are both aspheric, and the image-side surface of the sixth lens element includes at least one convex critical point in an off-axial region thereof. When an axial distance between the second lens element and the third lens element is T23, a central thickness of the second lens element is CT2, a central thickness of the third lens element is CT3, a curvature radius of an object-side surface of the second lens element is R3, and a curvature radius of an image-side surface of the second lens element is R4, the following conditions are satisfied:

$1.05 < T23/(CT2+CT3)$; and $(R3+R4)/(R3-R4) < 0.60$.

According to another aspect of the present disclosure, an image capturing apparatus includes the imaging optical lens system according to the aforementioned aspect and an image sensor, wherein the image sensor is disposed on the image surface of the imaging optical lens system.

According to another aspect of the present disclosure, an electronic device includes the image capturing apparatus according to the foregoing aspect.

According to another aspect of the present disclosure, an imaging optical lens system includes six lens elements, the six lens elements being, in order from an object side to an image side, a first lens element, a second lens element, a third lens element, a fourth lens element, a fifth lens element and a sixth lens element. The first lens element has positive refractive power. The fifth lens element has an object-side surface being convex in a paraxial region thereof and an image-side surface being concave in a paraxial region thereof, wherein the object-side surface and the image-side surface of the fifth lens element are both aspheric. The sixth lens element has an image-side surface being concave in a paraxial region thereof, wherein an object-side surface and the image-side surface of the sixth lens element are both aspheric, and the image-side surface of the sixth lens element includes at least one convex critical point in an off-axial region thereof. When an axial distance between the second lens element and the third lens element is T23, an axial distance between the fifth lens element and the sixth lens element is T56, a central thickness of the second lens element is CT2, a central thickness of the third lens element is CT3, a central thickness of the sixth lens element is CT6, a curvature radius of an object-side surface of the second lens element is R3, and a curvature radius of an image-side surface of the second lens element is R4, the following conditions are satisfied:

$1.0 < T23/(CT2+CT3)$;

$(R3+R4)/(R3-R4) < 0.60$; and $0 < CT6/T56 < 5.0$.

According to another aspect of the present disclosure, an imaging optical lens system includes six lens elements, the six lens elements being, in order from an object side to an image side, a first lens element, a second lens element, a third lens element, a fourth lens element, a fifth lens element and a sixth lens element. The first lens element has positive refractive power. The third lens element has an image-side surface being concave in a paraxial region thereof, wherein an object-side surface and the image-side surface of the third lens element are both aspheric, and the image-side surface of the third lens element includes at least one convex shape in an off-axial region thereof. The fourth lens element has an object-side surface and an image-side surface being both aspheric. The fifth lens element has an image-side surface being concave in a paraxial region thereof, wherein an object-side surface and the image-side surface of the fifth lens element are both aspheric. The sixth lens element has an image-side surface being concave in a paraxial region thereof, wherein an object-side surface and the image-side surface of the sixth lens element are both aspheric, and the image-side surface of the sixth lens element includes at least one convex critical point in an off-axial region thereof. When an axial distance between the second lens element and the third lens element is T23, an axial distance between the fifth lens element and the sixth lens element is T56, a central thickness of the second lens element is CT2, a central thickness of the third lens element is CT3, and a central thickness of the sixth lens element is CT6, the following conditions are satisfied:

$$1.25 < T23/(CT2+CT3) < 4.0; \text{ and}$$

$$0 < CT6/T56 < 5.0.$$

According to another aspect of the present disclosure, an image capturing apparatus includes an imaging optical lens system having at least six lens elements and includes an aperture adjustment unit. A first lens element is one of the six lens elements closest to an object side of the imaging optical lens system. When an axial distance between an object-side surface of the first lens element and an image surface is TL, a maximum image height of the imaging optical lens system is imgH, a minimum entrance pupil diameter of the imaging optical lens system is EPDmin, and a maximum entrance pupil diameter of the imaging optical lens system is EPDmax, the following conditions are satisfied:

$$TL/\text{Img}H < 1.80; \text{ and}$$

$$0 < EPD\text{min}/EPD\text{max} < 0.75.$$

DETAILED DESCRIPTION

Figure 1A:
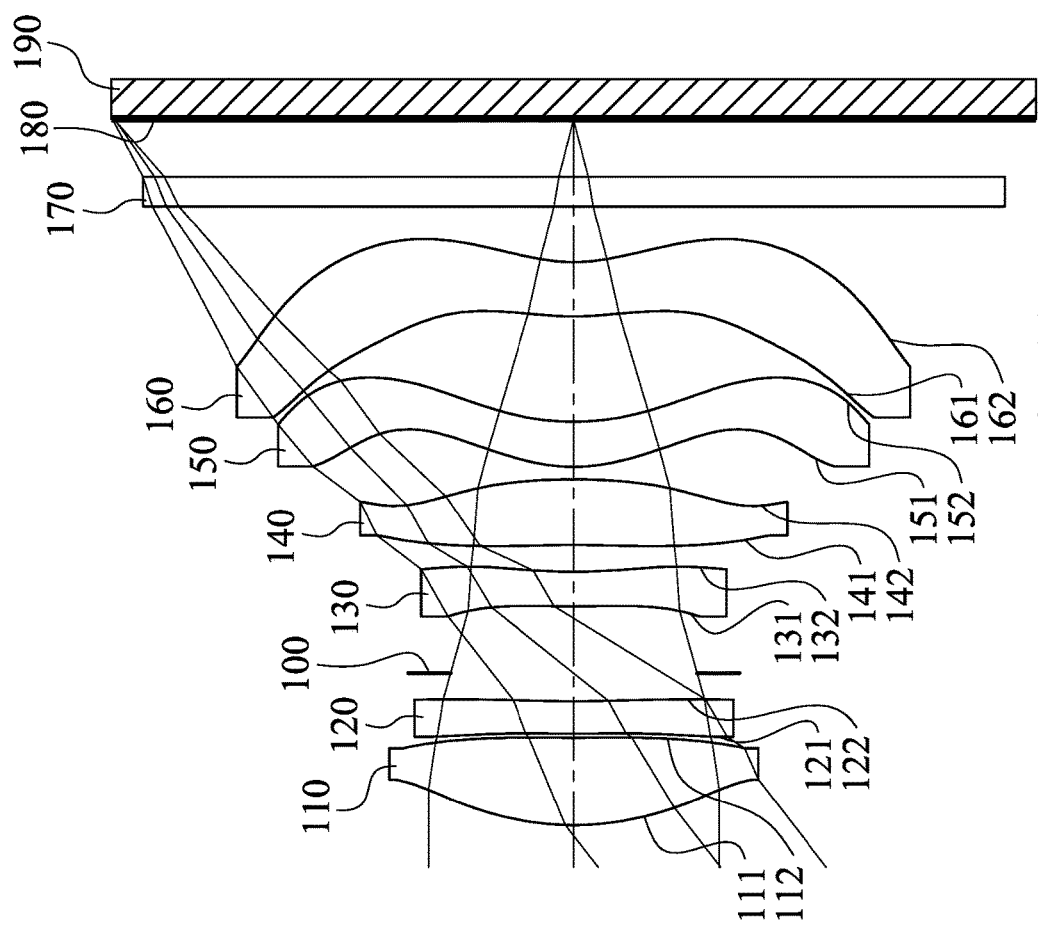
FIG. 1A is a schematic view of an image capturing apparatus according to the 1st embodiment of the present disclosure.

An imaging optical lens system includes six lens elements, in order from an object side to an image side, a first lens element, a second lens element, a third lens element, a fourth lens element, a fifth lens element and a sixth lens element.

According to the imaging optical lens system in the aforementioned paragraph, there is no relative movement between every two of the first lens element, the second lens element, the third lens element, the fourth lens element, the fifth lens element and the sixth lens element that are adjacent to each other. Therefore, it is favorable for reducing misalignment with an optical axis of each lens element caused by the relative movement among the lens elements.

The first lens element has positive refractive power. Therefore, it is favorable for reducing the total track length of the imaging optical lens system.

The third lens element can have negative refractive power and can have an image-side surface being concave in a paraxial region thereof. Therefore, it is favorable for effectively correcting astigmatism of the imaging optical lens system. Furthermore, the image-side surface of the third lens element can include at least one convex shape in an off-axial region thereof. Therefore, it is favorable for correcting off-axial aberrations.

The fifth lens element can have positive refractive power, and can have an object-side surface being convex in a paraxial region thereof and an image-side surface being concave in a paraxial region thereof. Therefore, it is favorable for reducing spherical aberrations. Furthermore, the image-side surface of the fifth lens element can include at least one convex critical point in an off-axial region thereof. Therefore, it is favorable for correcting aberrations of the paraxial and off-axial regions.

The sixth lens element can have negative refractive power and has an image-side surface being concave in a paraxial region thereof. Therefore, the principal point of the imaging optical lens system can be positioned away from the image surface so as to reduce the back focal length and maintain the compact size. Furthermore, the image-side surface of the sixth lens element includes at least one convex critical point in an off-axial region thereof. Therefore, it is favorable for correcting aberrations of the paraxial and off-axial regions.

According to the imaging optical lens system of the present disclosure, a critical point is a non-axial point of the lens surface where its tangent is perpendicular to the optical axis, wherein a convex critical point is a critical point located on a convex shape of the lens surface.

When an axial distance between the second lens element and the third lens element is T23, a central thickness of the second lens element is CT2, and a central thickness of the third lens element is CT3, the following condition is satisfied: $1.0 < T23/(CT2+CT3)$. Therefore, it is favorable for controlling the manufacturing tolerances of the first lens element and the second lens element easily, so as to enhance the manufacturability of the imaging optical lens system. Preferably, the following condition is satisfied: $1.05 < T23/(CT2+CT3)$. More preferably, the following condition is satisfied: $1.25 < T23/(CT2+CT3) < 4.0$.

When a curvature radius of an object-side surface of the second lens element is R3, and a curvature radius of an image-side surface of the second lens element is R4, the following condition is satisfied: $(R3+R4)/(R3-R4) < 0.60$. Therefore, it is favorable for ensuring a more moderate shape at the off-axial region on the image-side surface of the second lens element to avoid the stray light caused by the surface reflection from an excessively curved off-axial shape, and a sufficient off-axial space between the second lens element and the third lens element to properly fit a shutter element between thereof.

When a central thickness of the sixth lens element is CT6, and an axial distance between the fifth lens element and the sixth lens element is T56, the following condition is satisfied: $0 < CT6/T56 < 5.0$. Therefore, it is favorable for ensuring a sufficient space between the fifth lens element and the sixth lens element so as to avoid the structural interference therebetween and provide the advantages of each individual lens element. Preferably, the following condition is satisfied: $0.20 < CT6/T56 < 2.20$.

When a displacement in parallel with the optical axis from an axial vertex on the object-side surface of the second lens element to a maximum effective radius position on the object-side surface of the second lens element is Sag21, a displacement in parallel with the optical axis from an axial vertex on the image-side surface of the second lens element to a maximum effective radius position on the image-side surface of the second lens element is Sag22, and the central thickness of the second lens element is CT2, the following condition is satisfied: $0 < (|Sag21|+|Sag22|)/CT2 < 1.0$. Therefore, it is favorable for further ensuring the sufficient off-axial space between the second lens element and the third lens element to enhance the manufacturability and insert an element, such as a shutter therebetween.

When an axial distance between the image-side surface of the sixth lens element and the image surface is BL, and the axial distance between the second lens element and the third lens element is T23, the following condition is satisfied: $0.50 < BL/T23 < 2.0$. Therefore, it is favorable for further reducing the back focal length so as to enhance compactness of the imaging optical lens system.

When an axial distance between an object-side surface of the first lens element and the image surface is TL, and a maximum image height of the imaging optical lens system is ImgH, the following condition is satisfied: $TL/ImgH < 1.80$. Therefore, it is favorable for obtaining both the short total track length and a large imaging area of the imaging optical lens system so as to be applied to an image capturing apparatus with high resolution.

When a focal length of the first lens element is f1, a focal length of the second lens element is f2, a focal length of the third lens element is f3, a focal length of the fourth lens element is f4, a focal length of the fifth lens element is f5, and a focal length of the sixth lens element is f6, the following conditions are satisfied: $|f1|<|f2|$; $|f3|<|f3|$; $|f1|<|f4|$; $|f1|<|f5|$; and $|f1|<|f6|$. Therefore, it is favorable for the light to easily propagate into the imaging optical lens system and converge on the image surface.

When a focal length of the imaging optical lens system is f, and the axial distance between the second lens element and the third lens element is T23, the following condition is satisfied: $3.0 < f/T23 < 7.50$. Therefore, it is favorable for miniaturizing the imaging optical lens system so as to be applied to compact electronic devices.

When an Abbe number of the second lens element is V2, and an Abbe number of the third lens element is V3, the following condition is satisfied: $30 < V2+V3 < 60$. Therefore, it is favorable for a proper balance between the chromatic aberration correction and the astigmatism correction.

When a vertical distance between one of the at least one convex critical point in the off-axial region on the image-side surface of the fifth lens element and the optical axis is YV5R2, and a vertical distance between one of the at least one convex critical point in the off-axial region on the image-side surface of the sixth lens element and the optical axis is YV6R2, the following condition is satisfied:

0.25<YV6R2/YV5R2<1.0. Therefore, it is favorable for the sixth lens element to correct aberrations and increase the relative illuminance.

The imaging optical lens system can further include an aperture adjustment unit for adjusting the size of an aperture stop, so that an effective radius of the aperture stop and the f-number of the imaging optical lens system can be changed.

When a minimum entrance pupil diameter of the imaging optical lens system is EPDmin, and a maximum entrance pupil diameter of the imaging optical lens system is EPDmax, the following condition is satisfied: 0<EPDmin/EPDmax<0.75. Therefore, the imaging optical lens system can utilize the functionalities of the aperture adjustment unit, such as adjusting depth of field, night photography, etc.

When the vertical distance between one of the at least one convex critical point in the off-axial region on the image-side surface of the sixth lens element and the optical axis is YV6R2, and the maximum entrance pupil diameter of the imaging optical lens system is EPDmax, the following condition is satisfied: 0.20<YV6R2/EPDmax<0.75. Therefore, it is favorable for ensuring sufficient aberration correction while having the largest aperture size of the imaging optical lens system, so that proper image quality can be maintained.

When the focal length of the imaging optical lens system is 1, and the curvature radius of the image-side surface of the second lens element is R4, the following condition is satisfied: f/|R4|<0.50. Therefore, it is favorable for avoiding the off-axial shape of the second lens element from being excessively curved, so as to reduce the stray light and ensure sufficient space in the off-axial region between the second lens element and the third lens element.

Each of the aforementioned features of the imaging optical lens system can be utilized in various combinations for achieving the corresponding effects.

According to the imaging optical lens system of the present disclosure, the lens elements thereof can be made of plastic or glass materials. When the lens elements are made of plastic materials, the manufacturing cost can be effectively reduced. When the lens elements are made of glass materials, the arrangement of the refractive power of the imaging optical lens system may be more flexible to design. Furthermore, surfaces of each lens element can be arranged to be aspheric, since the aspheric surface of the lens element is easy to form a shape other than spherical surfaces so as to have more controllable variables for eliminating aberrations thereof, and to further decrease the required number of the lens elements. Therefore, the total track length of the imaging optical lens system can also be reduced.

According to the imaging optical lens system of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the imaging optical lens system of the present disclosure, the refractive power or the focal length of a lens element being positive or negative may refer to the refractive power or the focal length in a paraxial region of the lens element.

According to the imaging optical lens system of the present disclosure, the imaging optical lens system can include at least one stop, such as an aperture stop, a glare stop or a field stop. The glare stop or the field stop is for eliminating the stray light and thereby improving the image resolution thereof.

According to the imaging optical lens system of the present disclosure, the image surface, depending on the corresponding image sensor, can be a planar surface or a curved surface with any curvature, particularly a curved surface being concave toward the object side.

According to the imaging optical lens system of the present disclosure, an aperture stop can be configured as a front stop or a middle stop. A front stop disposed between an imaged object and the first lens element can provide a longer distance between an exit pupil of the imaging optical lens system and the image surface to enable a telecentric effect, and thereby can improve the image-sensing efficiency of an image sensor. A middle stop disposed between the first lens element and the image surface is favorable for enlarging the field of view of the imaging optical lens system and thereby provides a wider field of view for the same.

According to the imaging optical lens system of the present disclosure, the imaging optical lens system can be optionally applied to moving focus optical systems. Furthermore, the imaging optical lens system is featured with good correction ability and high image quality, and can be applied to 3D (three-dimensional) image capturing applications, in products such as digital cameras, mobile devices, digital tablets, smart TVs, network monitoring devices, motion sensing input devices, driving recorders, rear view camera systems, robots, wearable devices and other electronic imaging products.

According to the present disclosure, an image capturing apparatus is provided. The image capturing apparatus includes the aforementioned imaging optical lens system according to the present disclosure and an image sensor, wherein the image sensor is disposed on or near the image surface of the aforementioned imaging optical lens system. Therefore, it is favorable for accommodating complex elements such as shutters, other mechanical aperture adjustment units, MEMS, filters, spacers and so on, but not limited thereto. It is also favorable for decreasing the chief ray angle of the maximum image height so as to avoid problems associated with a large chief ray angle resulted from a middle stop arrangement thereof. Preferably, the image capturing apparatus can further include a barrel member, a holder member or a combination thereof.

According to the present disclosure, an image capturing apparatus is further provided. The image capturing apparatus includes an imaging optical lens system having at least six lens elements and includes an aperture adjustment unit. The aperture adjustment unit is for adjusting the size of an aperture stop, so that an effective radius of the aperture stop and an f-number of the image capturing apparatus can be changed.

According to the image capturing apparatus of the present disclosure, a first lens element is the closest lens element to an object side of the imaging optical lens system of the six lens elements. When an axial distance between an object-side surface of the first lens element and an image surface is IL, and a maximum image height of the imaging optical lens system is ImgH, the following condition is satisfied: TL/ImgH<1.80. Therefore, it is favorable for obtaining both the short total track length and a large imaging area so as to be applied to the image capturing apparatus with high resolution.

According to the image capturing apparatus of the present disclosure, when a minimum entrance pupil diameter of the imaging optical lens system is EPDmin, and a maximum entrance pupil diameter of the imaging optical lens system is EPDmax, the following condition is satisfied: 0<EPDmin/EPDmax<0.75. Therefore, it is favorable for utilizing the functionalities of the aperture adjustment unit, such as adjusting depth of field, night photography, etc.

According to the image capturing apparatus of the present disclosure, the imaging optical lens system can include six lens elements, in order from an object side to an image side, the first lens element, the second lens element, the third lens element, the fourth lens element, the fifth lens element and the sixth lens element. The sixth lens element can have an image-side surface being concave in a paraxial region thereof, wherein the image-side surface of the sixth lens element can include at least one convex critical point in an off-axial region thereof. Therefore, it is favorable for the principal point of the imaging optical lens system being positioned away from the image side so as to reduce the back focal length, maintain the compact size, and correct aberrations in the paraxial and off-axial regions.

According to the image capturing apparatus of the present disclosure, when a vertical distance between one of at least one convex critical point in an off-axial region on an image-side surface of the fifth lens element and the optical axis is YV5R2, and a vertical distance between one of the at least one convex critical point in the off-axial region on the image-side surface of the sixth lens element and the optical axis is YV6R2, the following condition is satisfied: 0.25<YV6R21YV5R2<1.0. Therefore, it is favorable for the sixth lens element to correct aberrations and increase the relative illuminance.

According to the image capturing apparatus of the present disclosure, when an axial distance between the image-side surface of the sixth lens element and the image surface is BL, and an axial distance between the second lens element and the third lens element is T23, the following condition is satisfied: 0.50<BL/T23<2.0. Therefore, it is favorable for further reducing the back focal length so as to enhance compactness of the image capturing apparatus.

According to the image capturing apparatus of the present disclosure, When the axial distance between the second lens element and the third lens element is T23, a central thickness of the second lens element is CT2, and a central thickness of the third lens element is CT3, the following condition is satisfied: 1.0<T23/(CT2+CT3). Therefore, it is favorable for controlling the manufacturing tolerances of the first lens element and the second lens element easily, so as to enhance the manufacturability of the image capturing apparatus.

According to the image capturing apparatus of the present disclosure, when the vertical distance between one of the at least one convex critical point in the off-axial region on the image-side surface of the sixth lens element and the optical axis is YV6R2, and the maximum entrance pupil diameter of the imaging optical lens system is EPDmax, the following condition is satisfied: 0.20<YV6R2/EPDmax<0.75. Therefore, it is favorable for ensuring sufficient aberration correction while having the largest aperture size of the image capturing apparatus, so that proper image quality can be maintained.

According to the image capturing apparatus of the present disclosure, the image capturing apparatus can further include a barrel member, a holder member or a combination thereof.

Each of the aforementioned features of the image capturing apparatus can be utilized in various combinations for achieving the corresponding effects.

According to the present disclosure, an electronic device is provided, wherein the electronic device includes the aforementioned image capturing apparatus. Therefore, it is favorable for satisfying the need for compact size while enhancing the image quality. Preferably, the electronic device can further include but not limited to a control unit, a display, a storage unit, a random access memory unit (RAM) or a combination thereof.

According to the above description of the present disclosure, the following 1st-12th specific embodiments are provided for further explanation.

1st Embodiment

Figure 2A:
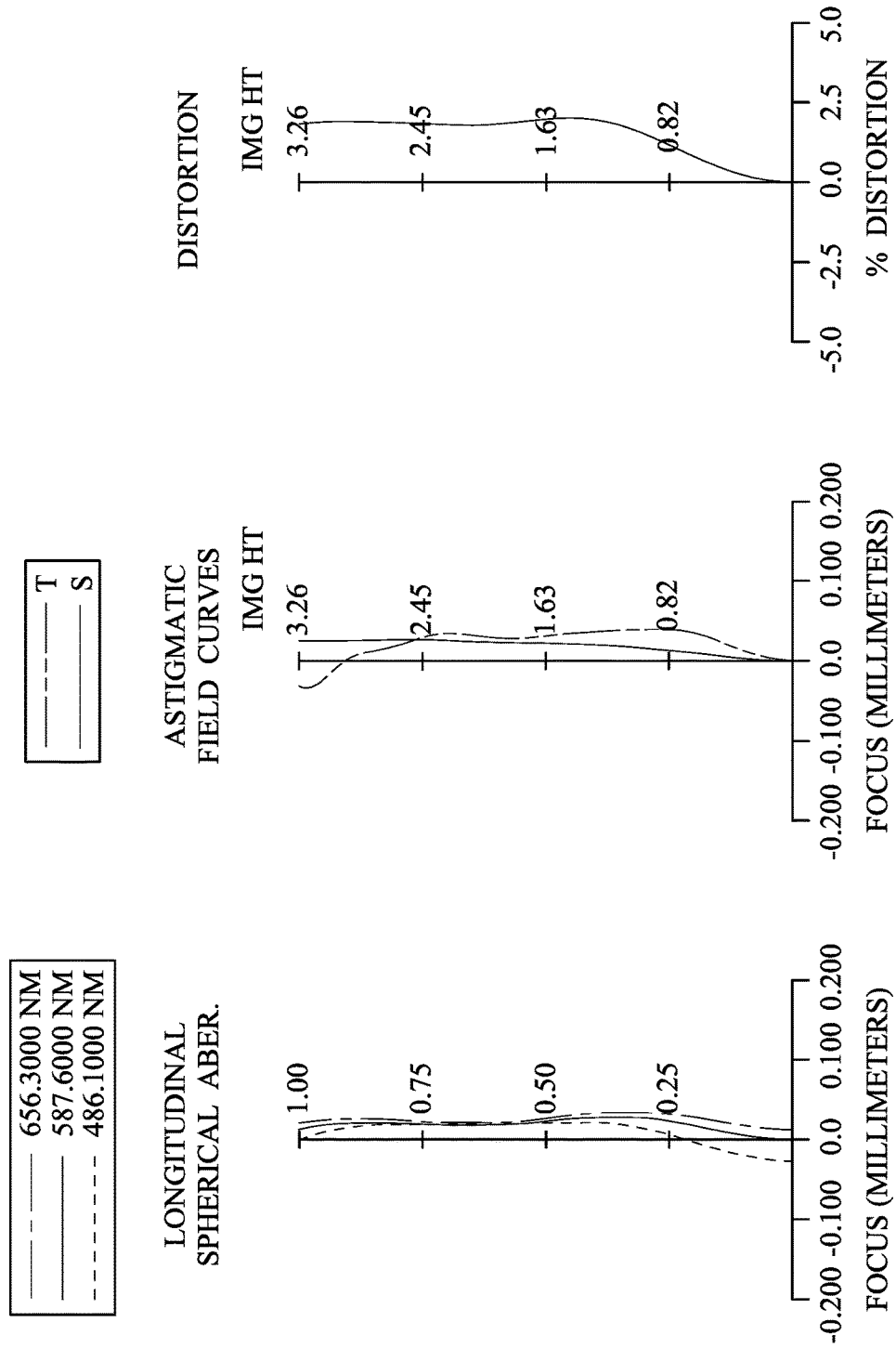
FIG. 2A shows spherical aberration curves, astigmatic field curves and a distortion curve of the image capturing apparatus according to FIG. 1A.

FIG. 1A is a schematic view of an image capturing apparatus according to the 1st embodiment of the present disclosure. FIG. 2A shows, in order from left to right, spherical aberration curves, astigmatic field curves and a distortion curve of the image capturing apparatus according to FIG. 1A. In FIG. 1A, the image capturing apparatus includes the imaging optical lens system (its reference numeral is omitted) and an image sensor 190. The imaging optical lens system includes, in order from an object side to an image side, a first lens element 110, a second lens element 120, an aperture stop 100, a third lens element 130, a fourth lens element 140, a fifth lens element 150, a sixth lens element 160, an IR-cut filter 170 and an image surface 180. The image sensor 190 is disposed on the image surface 180 of the imaging optical lens system. There is an air gap and no relative movement between every two of the first lens element 110, the second lens element 120, the third lens element 130, the fourth lens element 140, the fifth lens element 150 and the sixth lens element 160 that are adjacent to each other. The imaging optical lens system includes six lens elements (110-160) without additional one or more lens elements inserted between the first lens element 110 and the sixth lens element 160.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with positive refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric. Furthermore, the image-side surface 132 of the third lens element 130 includes at least one convex shape in an off-axial region thereof.

The fourth lens element 140 with positive refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric.

The fifth lens element 150 with positive refractive power has an object-side surface 151 being convex in a paraxial region thereof and an image-side surface 152 being concave in a paraxial region thereof. The fifth lens element 150 is made of a plastic material, and has the object-side surface 151 and the image-side surface 152 being both aspheric. Furthermore, the image-side surface 152 of the fifth lens element 150 includes at least one convex critical point in an off-axial region thereof.

The sixth lens element 160 with negative refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric. Furthermore, the image-side surface 162 of the sixth lens element 160 includes at least one convex critical point in an off-axial region thereof.

The IR-cut filter 170 is made of a glass material and located between the sixth lens element 160 and the image surface 180, and will not affect the focal length of the imaging optical lens system.

The equation of the aspheric surface profiles of the aforementioned lens elements of the 1st embodiment is expressed as follows:

$$X(Y) = (Y^2/R)/\left(1 + \operatorname{sqrt}\left(1 - (1+k) \times (Y/R)^2\right)\right) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging optical lens system according to the 1st embodiment, when a focal length of the imaging optical lens system is f, and half of a maximum field of view of the imaging optical lens system is HFOV, these parameters have the following values: f=4.13 mm; and HFOV=37.7 degrees.

Figure 1B:
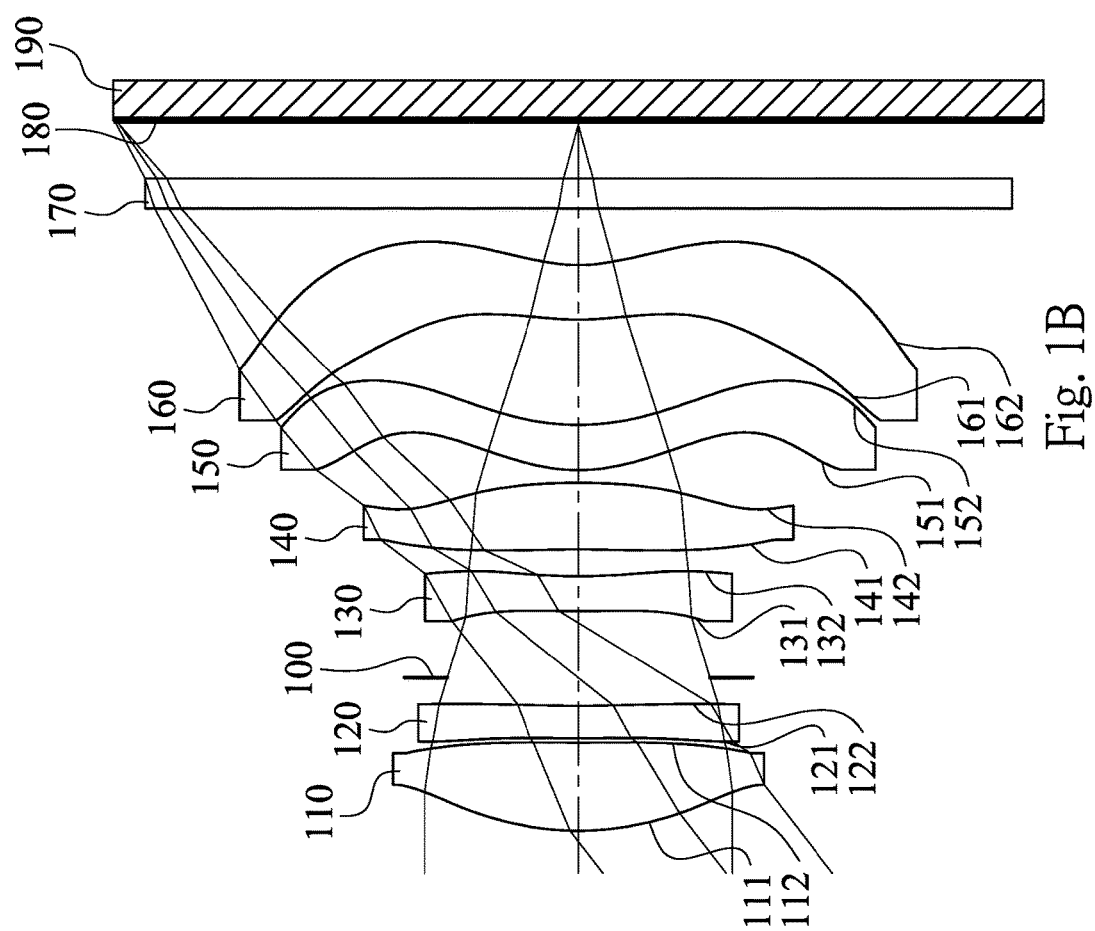
FIG. 1B is another schematic view of the image capturing apparatus according to the 1st embodiment.
Figure 1C:
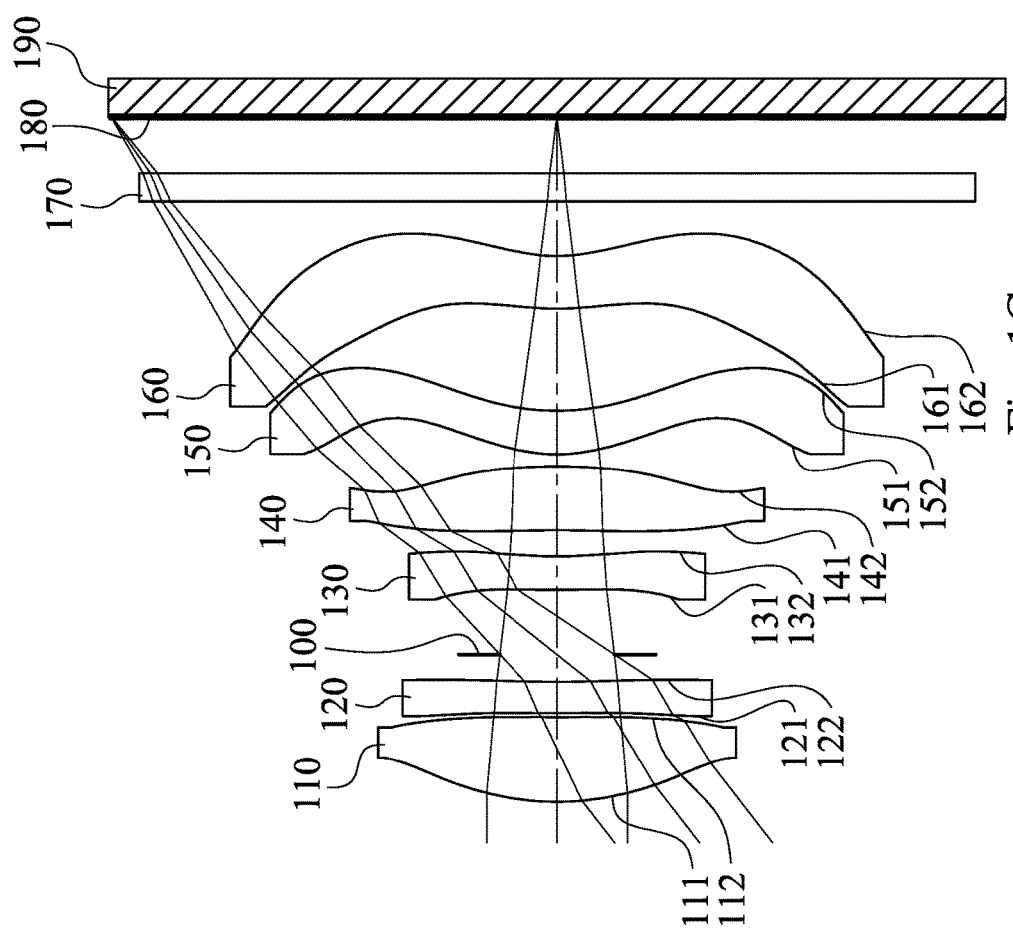
FIG. 1C is further another schematic view of the image capturing apparatus according to the 1st embodiment.
Figure 2B:
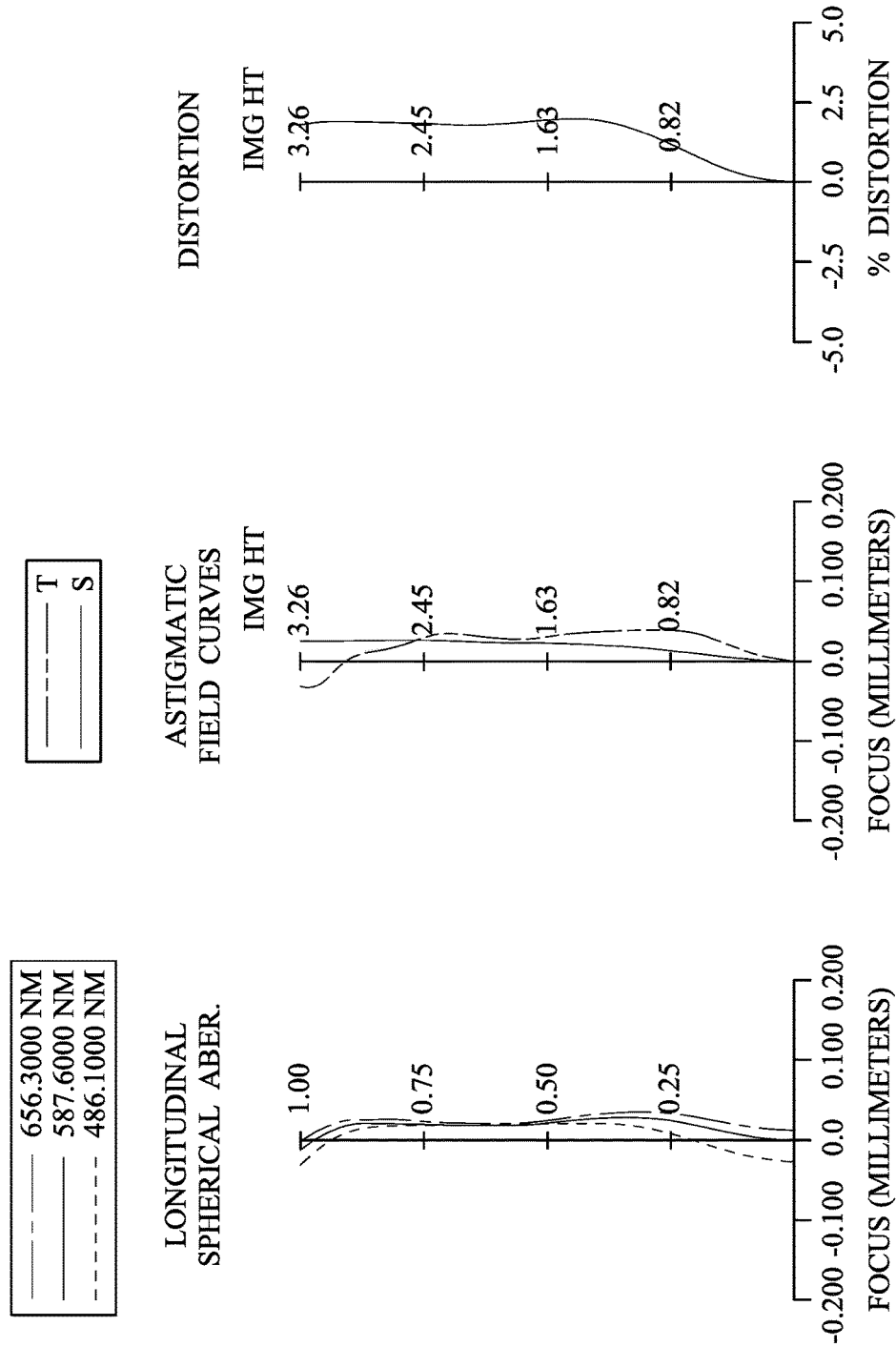
FIG. 2B shows spherical aberration curves, astigmatic field curves and a distortion curve of the image capturing apparatus according to FIG. 1B.
Figure 2C:
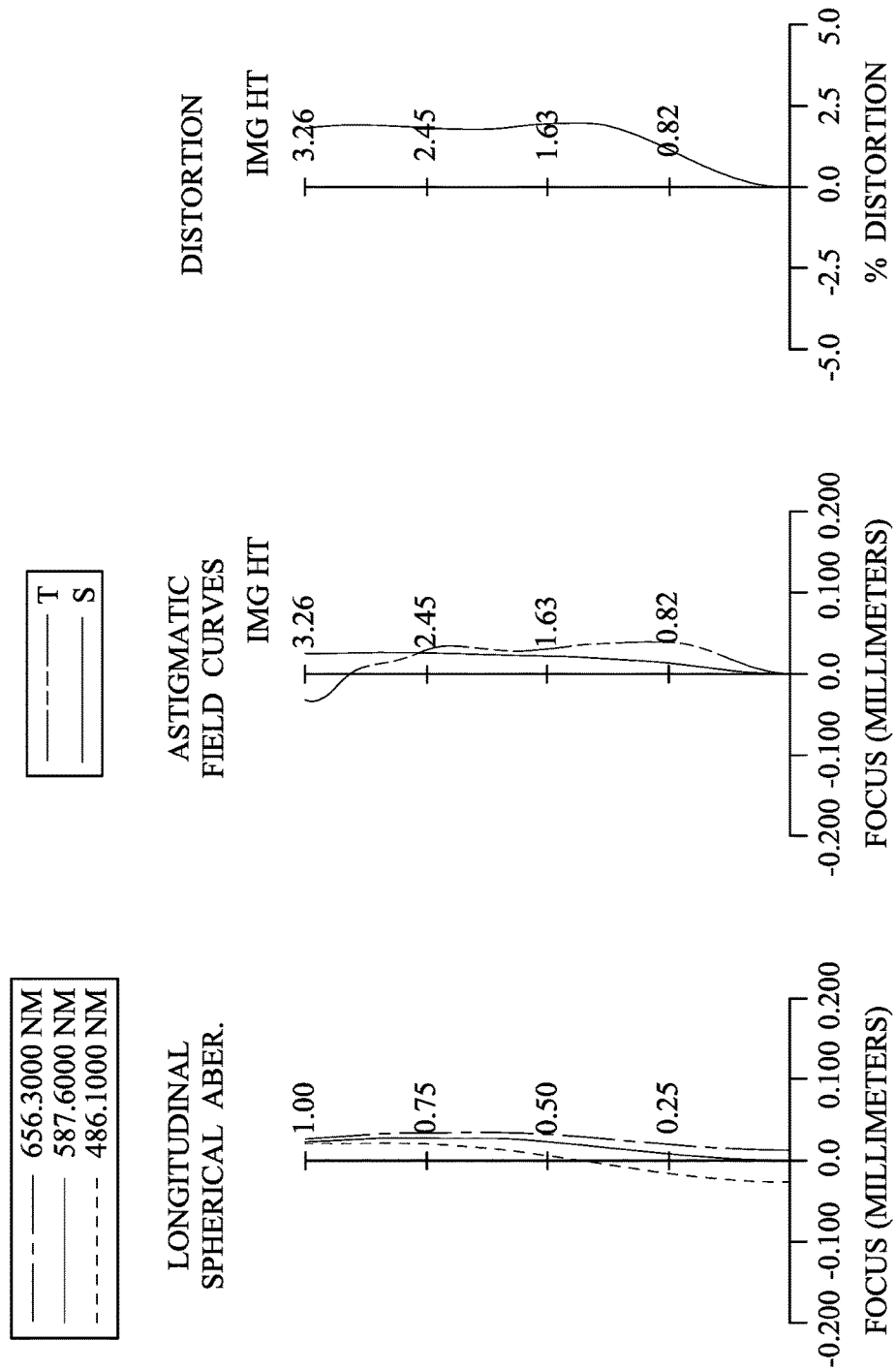
FIG. 2C shows spherical aberration curves, astigmatic field curves and a distortion curve of the image capturing apparatus according to FIG. 1C.

FIG. 1B is another schematic view of the image capturing apparatus according to the 1st embodiment. FIG. 2B shows, in order from left to right, spherical aberration curves, astigmatic field curves and a distortion curve of the image capturing apparatus according to FIG. 1B. FIG. 1C is further another schematic view of the image capturing apparatus according to the 1st embodiment. FIG. 2C shows, in order from left to right, spherical aberration curves, astigmatic field curves and a distortion curve of the image capturing apparatus according to FIG. 1C. In FIG. 1A, FIG. 1B and FIG. 1C, the aperture stop 100 is an adjustable stop. When an f-number of the imaging optical lens system is Fno, the value of the parameter Fno in the 1st embodiment can be adjusted to 1.90 (corresponding to FIG. 1B), 2.00 (corresponding to FIG. 1A) and 4.00 (corresponding to FIG. 1C).

In the imaging optical lens system according to the 1st embodiment, when a minimum entrance pupil diameter of the imaging optical lens system is EPDmin, and a maximum entrance pupil diameter of the imaging optical lens system is EPDmax, the following condition is satisfied: EPDmin/EPDmax=0.48.

In the imaging optical lens system according to the 1st embodiment, when a curvature radius of the object-side surface 121 of the second lens element 120 is R3, and a curvature radius of the image-side surface 122 of the second lens element 120 is R4, the following condition is satisfied:

(R3+R4)/(R3−R4)=−103.67.

In the imaging optical lens system according to the 1st embodiment, when the focal length of the imaging optical lens system is f, and the curvature radius of the image-side surface 122 of the second lens element 120 is R4, the following condition is satisfied: f/|R4|=0.48.

In the imaging optical lens system according to the 1st embodiment, when an axial distance between the second lens element 120 and the third lens element 130 is T23, a central thickness of the second lens element 120 is CT2, and a central thickness of the third lens element 130 is CT3, the following condition is satisfied: T23/(CT2+CT3)=1.42.

In the imaging optical lens system according to the 1st embodiment, when a central thickness of the sixth lens element 160 is CT6, and an axial distance between the fifth lens element 150 and the sixth lens element 160 is T56, the following condition is satisfied: CT6/T56=0.52.

In the imaging optical lens system according to the 1st embodiment, when an axial distance between the image-side surface 162 of the sixth lens element 160 and the image surface 180 is BL, and the axial distance between the second lens element 120 and the third lens element 130 is T23, the following condition is satisfied: BL/T23=1.52.

In the imaging optical lens system according to the 1st embodiment, when an axial distance between the object-side surface 111 of the first lens element 110 and the image surface 180 is TL, and a maximum image height of the imaging optical lens system is ImgH (half of a diagonal length of an effective photosensitive area of the image sensor 190), the following condition is satisfied: TL/ImgH=1.54.

In the imaging optical lens system according to the 1st embodiment, when a displacement in parallel with the optical axis from an axial vertex on the object-side surface 121 of the second lens element 120 to a maximum effective radius position on the object-side surface 121 of the second lens element 120 is Sag21 (when the displacement begins from one point projecting towards the image side, Sag21 is positive; when the displacement projects towards the object side, Sag21 is negative), a displacement in parallel with the optical axis from an axial vertex on the image-side surface 122 of the second lens element 120 to a maximum effective radius position on the image-side surface 122 of the second lens element 120 is Sag22 (when the displacement begins from one point projecting towards the image side, Sag22 is positive; when the displacement projects towards the object side, Sag22 is negative), and the central thickness of the second lens element 120 is CT2, the following condition is satisfied: (|Sag21|+|Sag22|)/CT2=0.15.

In the imaging optical lens system according to the 1st embodiment, when the focal length of the imaging optical lens system is f, and the axial distance between the second lens element 120 and the third lens element 130 is T23, the following condition is satisfied: f/T23=6.14.

In the imaging optical lens system according to the 1st embodiment, when an Abbe number of the second lens element 120 is V2, and an Abbe number of the third lens element 130 is V3, the following condition is satisfied: V2+V3=39.0.

Figure 18:
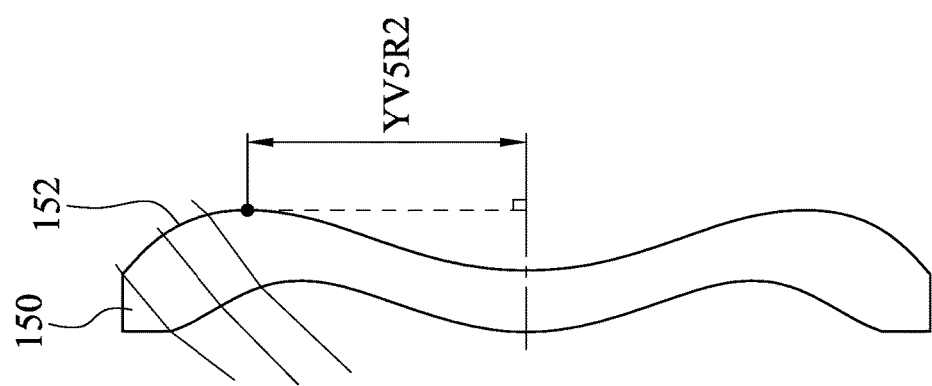
FIG. 18 shows a schematic view of the parameter YV5R2 of the imaging optical lens system of the image capturing apparatus according to FIG. 1A.

FIG. 18 shows a schematic view of the parameter YV5R2 of the imaging optical lens system of the image capturing apparatus according to FIG. 1A. In FIG. 18, when a vertical distance between one of the at least one convex critical point in the off-axial region on the image-side surface 152 of the fifth lens element 150 and the optical axis is YV5R2, and a vertical distance between one of the at least one convex critical point in the off-axial region on the image-side surface 162 of the sixth lens element 160 and the optical axis is YV6R2, the following condition is satisfied: YV6R2|YV5R2=0.74.

In the imaging optical lens system according to the 1st embodiment, when the vertical distance between one of the at least one convex critical point in the off-axial region on the image-side surface 162 of the sixth lens element 160 and the optical axis is YV6R2, and the maximum entrance pupil diameter of the imaging optical lens system is EPDmax, the following condition is satisfied: YV6R2/EPDmax=0.49.

In the imaging optical lens system according to the 1st embodiment, when a focal length of the first lens element 110 is f1, a focal length of the second lens element 120 is f2, a focal length of the third lens element 130 is f3, a focal length of the fourth lens element 140 is f4, a focal length of the fifth lens element 150 is f5, and a focal length of the sixth lens element 160 is f6, the following conditions are satisfied: $|f1|<|f2|$; $|f1|<|f3|$; $|f1|<|f4|$; $|f1|<|f5|$; and $<|f1|<|f6|$.

The detailed optical data of the 1st embodiment are shown in TABLE 1 and the aspheric surface data are shown in TABLE 2 below.

TABLE 1

1st Embodiment
f = 4.13 mm, Fno = 2.00*, HFOV = 37.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.045 | ASP | 0.622 | Plastic | 1.545 | 56.0 | 4.73 |
| 2 | | 8.843 | ASP | 0.030 | | | | |
| 3 | Lens 2 | 8.358 | ASP | 0.230 | Plastic | 1.671 | 19.5 | 416.09 |
| 4 | | 8.520 | ASP | 0.200 | | | | |
| 5 | Ape. Stop | Plano | | 0.473 | | | | |
| 6 | Lens 3 | 10.376 | ASP | 0.245 | Plastic | 1.671 | 19.5 | −8.61 |
| 7 | | 3.676 | ASP | 0.190 | | | | |
| 8 | Lens 4 | −9.299 | ASP | 0.469 | Plastic | 1.583 | 30.2 | 30.91 |
| 9 | | −6.249 | ASP | 0.090 | | | | |
| 10 | Lens 5 | 1.268 | ASP | 0.320 | Plastic | 1.544 | 55.9 | 5.96 |
| 11 | | 1.898 | ASP | 0.746 | | | | |
| 12 | Lens 6 | 2.241 | ASP | 0.385 | Plastic | 1.534 | 55.9 | −5.97 |
| 13 | | 1.237 | ASP | 0.400 | | | | |
| 14 | IR-cut filter | Plano | | 0.210 | Glass | 1.517 | 64.2 | — |
| 15 | | Plano | | 0.411 | | | | |
| 16 | Image | Plano | | — | | | | |

Reference wavelength is 587.6 nm (d-line).
Effective radius of Surface 2 is 1.212 mm.
Effective radius of Surface 10 is 1.850 mm.
*The aperture stop 100 of Surface 5 is the adjustable stop, and the value of the parameter Fno in the 1st embodiment can be adjusted to 1.90 (corresponding to FIG. 1B), 2.00 (corresponding to FIG. 1A) and 4.00 (corresponding to FIG. 1C).

TABLE 2

Aspheric Coefficients

| | Surface # | | | | | |
|---|---|---|---|---|---|---|
| | 1 | 2 | 3 | 4 | 6 | 7 |
| k = | −4.8250E−01 | −7.3926E+01 | −7.3959E+01 | −4.6722E+01 | 1.7576E+01 | 2.1401E+00 |
| A4 = | −9.4930E−03 | −3.0560E−01 | −3.2472E−01 | −1.0013E−01 | −2.0697E−01 | −1.3318E−01 |
| A6 = | 2.5622E−02 | 5.6179E−01 | 6.3508E−01 | 1.6378E−01 | 5.3148E−03 | −3.5616E−02 |
| A8 = | −7.6251E−02 | −5.9024E−01 | −6.9999E−01 | −1.9645E−01 | 3.8173E−02 | 7.5967E−02 |
| A10 = | 8.8417E−02 | 3.4952E−01 | 4.4936E−01 | 1.3045E−01 | 7.2088E−03 | −4.3406E−02 |
| A12 = | −5.4224E−02 | −1.1205E−01 | −1.5132E−01 | −3.5544E−02 | | 1.5311E−02 |
| A14 = | 1.1661E−02 | 1.5167E−02 | 2.1045E−02 | | | |

| | Surface # | | | | | |
|---|---|---|---|---|---|---|
| | 8 | 9 | 10 | 11 | 12 | 13 |
| k = | −2.1777E+01 | −3.9846E+00 | −5.8898E+00 | −8.5886E−01 | 0.0000E+00 | −4.7670E+00 |
| A4 = | 1.2747E−01 | −2.0920E−01 | 8.1075E−02 | 7.0369E−02 | −3.9180E−01 | −1.8944E−01 |
| A6 = | −1.2270E−01 | 2.7561E−01 | −1.4681E−01 | −1.8046E−01 | 2.2082E−01 | 1.0789E−01 |
| A8 = | 6.8004E−02 | −2.4650E−01 | 6.6634E−02 | 1.0817E−01 | −1.1802E−01 | −5.0738E−02 |
| A10 = | −1.3156E−02 | 1.5842E−01 | −2.0280E−02 | −3.6624E−02 | 5.4487E−02 | 1.5714E−02 |
| A12 = | −4.2903E−04 | −5.2216E−02 | 4.2436E−03 | 7.4974E−03 | −1.6095E−02 | −2.8938E−03 |
| A14 = | | 6.4658E−03 | −3.8493E−04 | −8.9249E−04 | 2.4716E−03 | 2.7938E−04 |
| A16 = | | | | 4.7859E−05 | −1.5028E−04 | −1.0652E−05 |

In TABLE 1, the curvature radius, the thickness and the focal length are shown in millimeters (mm). Surface numbers 0-16 represent the surfaces sequentially arranged from the object-side to the image-side along the optical axis. In TABLE 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
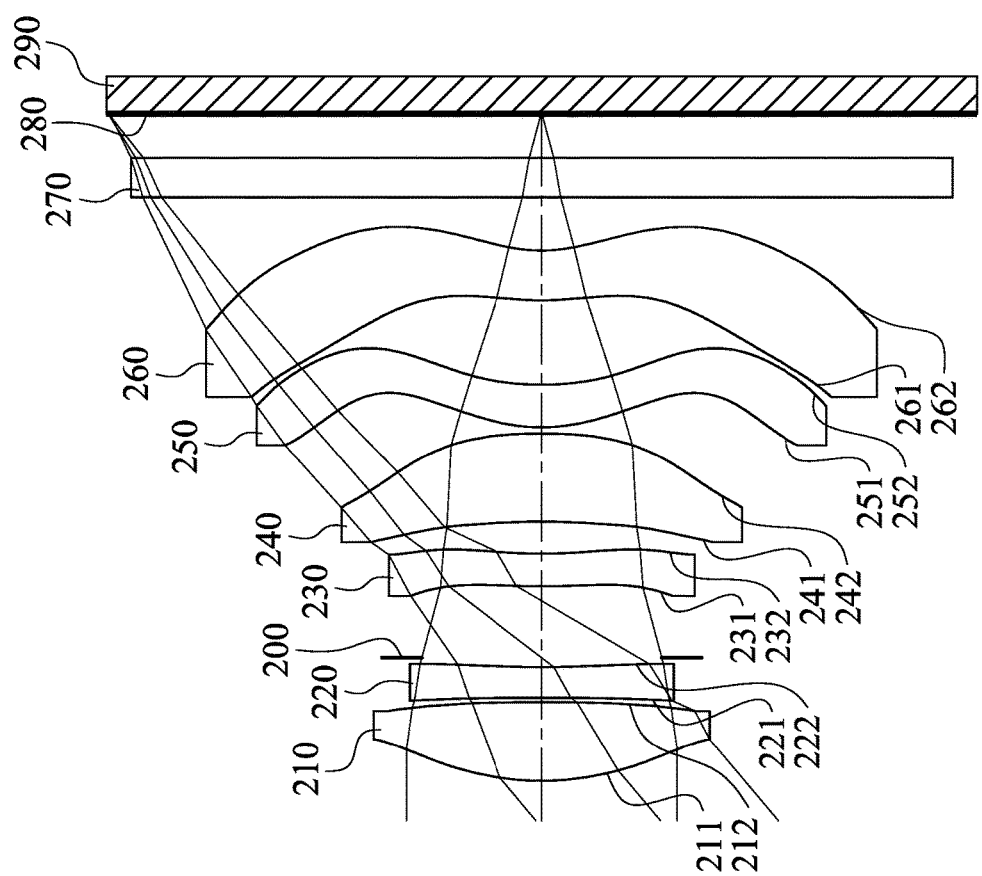
FIG. 3 is a schematic view of an image capturing apparatus according to the 2nd embodiment of the present disclosure.
Figure 4:
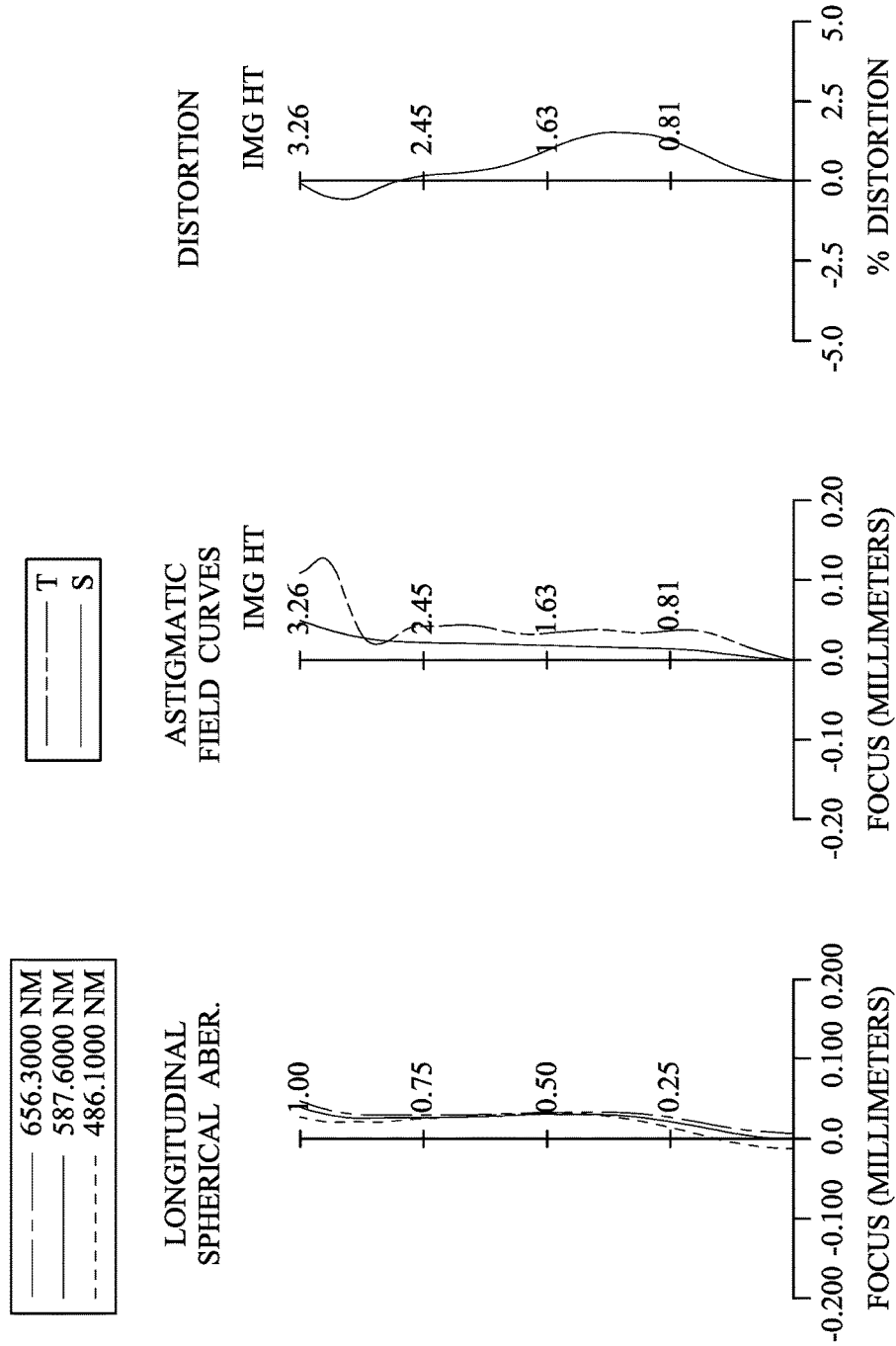
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows, in order from left to right, spherical aberration curves, astigmatic field curves and a distortion curve of the image capturing apparatus according to the 2nd embodiment. In FIG. 3, the image capturing apparatus includes the imaging optical lens system (its reference numeral is omitted) and an image sensor 290. The imaging optical lens system includes, in order from an object side to an image side, a first lens element 210, a second lens element 220, an aperture stop 200, a third lens element 230, a fourth lens element 240, a fifth lens element 250, a sixth lens element 260, an IR-cut filter 270 and an image surface 280. The image sensor 290 is disposed on the image surface 280 of the imaging optical lens system. There is an air gap and no relative movement between every two of the first lens element 210, the second lens element 220, the third lens element 230, the fourth lens element 240, the fifth lens element 250 and the sixth lens element 260 that are adjacent to each other. The imaging optical lens system includes six lens elements (210-260) without additional one or more lens elements inserted between the first lens element 210 and the sixth lens element 260.

The first lens element 210 with positive refractive power has an object-side surface 211 being convex in a paraxial region thereof and an image-side surface 212 being convex in a paraxial region thereof. The first lens element 210 is made of a plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric. Furthermore, the image-side surface 232 of the third lens element 230 includes at least one convex shape in an off-axial region thereof.

The fourth lens element 240 with positive refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric.

The fifth lens element 250 with positive refractive power has an object-side surface 251 being convex in a paraxial region thereof and an image-side surface 252 being concave in a paraxial region thereof. The fifth lens element 250 is made of a plastic material, and has the object-side surface 251 and the image-side surface 252 being both aspheric. Furthermore, the image-side surface 252 of the fifth lens element 250 includes at least one convex critical point in an off-axial region thereof.

The sixth lens element 260 with negative refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 262 of the sixth lens element 260 includes at least one convex critical point in an off-axial region thereof.

The IR-cut filter 270 is made of a glass material and located between the sixth lens element 260 and the image surface 280, and will not affect the focal length of the imaging optical lens system.

The detailed optical data of the 2nd embodiment are shown in TABLE 3 and the aspheric surface data are shown in TABLE 4 below.

TABLE 3

2nd Embodiment
f = 3.87 mm, Fno = 1.90, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.111 | ASP | 0.595 | Plastic | 1.545 | 56.0 | 3.80 |
| 2 | | −100.000 | ASP | 0.032 | | | | |
| 3 | Lens 2 | 21.622 | ASP | 0.230 | Plastic | 1.671 | 19.5 | −13.54 |
| 4 | | 6.368 | ASP | 0.072 | | | | |
| 5 | Ape. Stop | Plano | | 0.536 | | | | |
| 6 | Lens 3 | 5.378 | ASP | 0.245 | Plastic | 1.671 | 19.5 | −19.63 |
| 7 | | 3.749 | ASP | 0.240 | | | | |
| 8 | Lens 4 | −5.880 | ASP | 0.666 | Plastic | 1.544 | 55.9 | 40.97 |
| 9 | | −4.838 | ASP | 0.048 | | | | |
| 10 | Lens 5 | 1.424 | ASP | 0.320 | Plastic | 1.544 | 55.9 | 5.41 |
| 11 | | 2.543 | ASP | 0.633 | | | | |
| 12 | Lens 6 | 2.322 | ASP | 0.374 | Plastic | 1.544 | 55.9 | −4.69 |
| 13 | | 1.146 | ASP | 0.400 | | | | |

TABLE 3-continued

2nd Embodiment
f = 3.87 mm, Fno = 1.90, HFOV = 40.0 deg.

| Surface # | | Curvature Radius | Thickness | Material | Index | Abbe # | Focal Length |
|---|---|---|---|---|---|---|---|
| 14 | IR-cut filter | Plano | 0.300 | Glass | 1.517 | 64.2 | — |
| 15 | | Plano | 0.331 | | | | |
| 16 | Image | Plano | — | | | | |

Reference wavelength is 587.6 nm (d-line).
Effective radius of Surface 2 is 1.150 mm.
Effective radius of Surface 7 is 1.150 mm.

TABLE 4

Aspheric Coefficients

| | Surface # | | | | | |
|---|---|---|---|---|---|---|
| | 1 | 2 | 3 | 4 | 6 | 7 |
| k = | −4.3171E−01 | 8.2259E+01 | 9.0000E+01 | −1.1389E+01 | 6.8130E+00 | 5.1771E−01 |
| A4 = | −1.0347E−02 | −1.9239E−01 | −2.3892E−01 | −1.1218E−01 | −1.9182E−01 | −1.3551E−01 |
| A6 = | 2.6489E−02 | 4.4518E−01 | 5.4012E−01 | 1.8302E−01 | −7.8786E−03 | −1.6470E−02 |
| A8 = | −7.7821E−02 | −5.4981E−01 | −6.6101E−01 | −2.4028E−01 | −2.2833E−02 | −2.2735E−02 |
| A10 = | 8.9421E−02 | 3.7294E−01 | 4.4087E−01 | 1.6227E−01 | 4.4627E−02 | 5.5756E−02 |
| A12 = | −5.3821E−02 | −1.3619E−01 | −1.4274E−01 | −4.2203E−02 | | −1.3457E−02 |
| A14 = | 1.1429E−02 | 2.0821E−02 | 1.6434E−02 | | | |

| | Surface # | | | | | |
|---|---|---|---|---|---|---|
| | 8 | 9 | 10 | 11 | 12 | 13 |
| k = | −5.8196E+01 | 8.0948E+00 | −6.3804E+00 | −7.1860E−01 | 0.0000E+00 | −3.8720E+00 |
| A4 = | −2.8944E−03 | −2.6220E−01 | 1.4704E−01 | 2.5070E−01 | −4.0021E−01 | −2.2868E−01 |
| A6 = | 3.7588E−02 | 2.5516E−01 | −2.2470E−01 | −4.0515E−01 | 1.8236E−01 | 1.4095E−01 |
| A8 = | −1.7723E−01 | −1.7212E−01 | 1.0122E−01 | 2.6096E−01 | −5.0558E−02 | −6.6651E−02 |
| A10 = | 1.5850E−01 | 5.8397E−02 | −2.6783E−02 | −1.0180E−01 | 9.3280E−03 | 2.0528E−02 |
| A12 = | −4.1842E−02 | −5.5092E−04 | 4.4235E−03 | 2.4075E−02 | −1.2252E−03 | −3.6859E−03 |
| A14 = | | −2.3218E−03 | −3.2867E−04 | −3.1218E−03 | 1.0690E−04 | 3.4626E−04 |
| A16 = | | | | 1.6861E−04 | −5.1665E−06 | −1.3116E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 3.87 | BL/T23 | 1.70 |
| Fno | 1.90 | TL/ImgH | 1.54 |
| HFOV (deg.) | 40.0 | (|Sag21| + |Sag22|)/ | 0.20 |
| EPDmin/EPDmax | 1.00 | CT2 | |
| (R3 + R4)/(R3 − R4) | 1.83 | f/T23 | 6.37 |
| f/|R4| | 0.61 | V2 + V3 | 39.0 |
| T23/(CT2 + CT3) | 1.28 | YV6R2/YV5R2 | 0.82 |
| CT6/T56 | 0.59 | YV6R2/EPDmax | 0.53 |

Furthermore, in the imaging optical lens system according to the 2nd embodiment, when a focal length of the first lens element 210 is f1, a focal length of the second lens element 220 is f2, a focal length of the third lens element 230 is f3, a focal length of the fourth lens element 240 is f4, a focal length of the fifth lens element 250 is f5, and a focal length of the sixth lens element 260 is f6, the following conditions are satisfied: |f1|<|f2|; |f1|<|f3|; <|f4|; |f1|<|f5|; and |f1|<|f6|.

3rd Embodiment

Figure 5A:
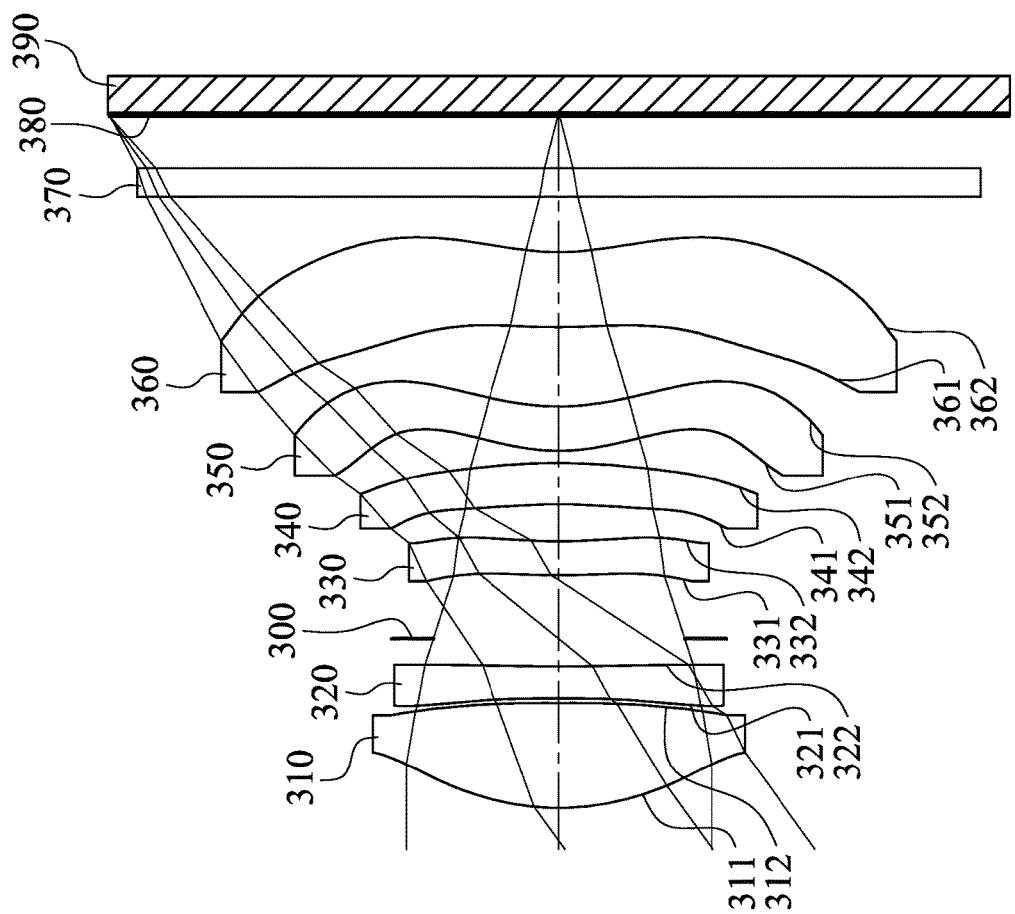
FIG. 5A is a schematic view of an image capturing apparatus according to the 3rd embodiment of the present disclosure.
Figure 6A:
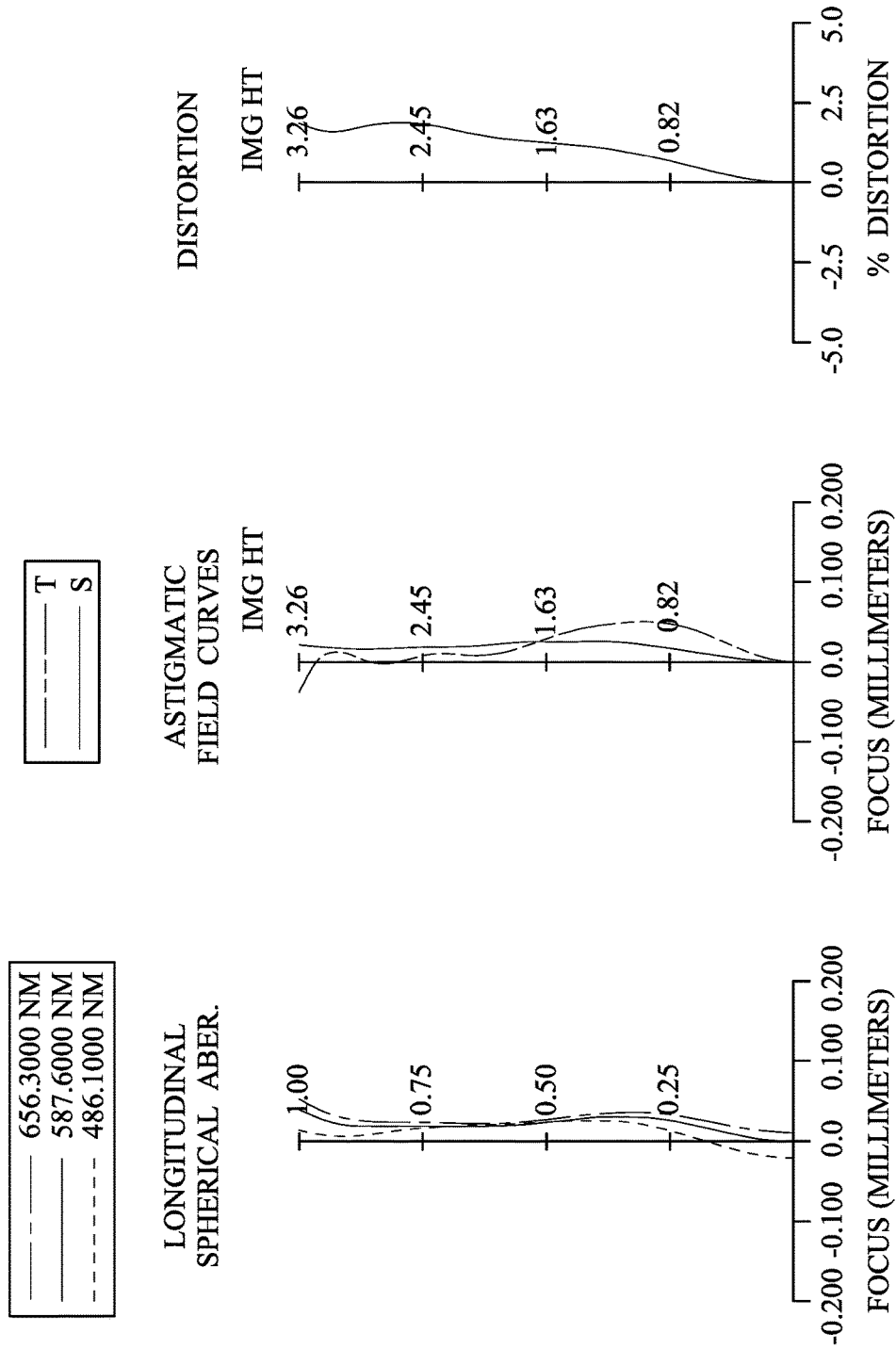
FIG. 6A shows spherical aberration curves, astigmatic field curves and a distortion curve of the image capturing apparatus according to FIG. 5A.

FIG. 5A is a schematic view of an image capturing apparatus according to the 3rd embodiment of the present disclosure. FIG. 6A shows, in order from left to right, spherical aberration curves, astigmatic field curves and a distortion curve of the image capturing apparatus according to FIG. 5A. In FIG. 5A, the image capturing apparatus includes the imaging optical lens system (its reference numeral is omitted) and an image sensor 390. The imaging optical lens system includes, in order from an object side to an image side, a first lens element 310, a second lens element 320, an aperture stop 300, a third lens element 330, a fourth lens element 340, a fifth lens element 350, a sixth lens element 360, an IR-cut filter 370 and an image surface 380. The image sensor 390 is disposed on the image surface 380 of the imaging optical lens system. There is an air gap and no relative movement between every two of the first lens element 310, the second lens element 320, the third lens element 330, the fourth lens element 340, the fifth lens element 350 and the sixth lens element 360 that are adjacent to each other. The imaging optical lens system includes six lens elements (310-360) without additional one or more lens elements inserted between the first lens element 310 and the sixth lens element 360.

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric. Furthermore, the image-side surface 332 of the third lens element 330 includes at least one convex shape in an off-axial region thereof.

The fourth lens element 340 with negative refractive power has an object-side surface 341 being concave in a paraxial region thereof and an image-side surface 342 being convex in a paraxial region thereof. The fourth lens element 340 is made of a plastic material, and has the object-side surface 341 and the image-side surface 342 being both aspheric.

The fifth lens element 350 with positive refractive power has an object-side surface 351 being convex in a paraxial region thereof and an image-side surface 352 being concave in a paraxial region thereof. The fifth lens element 350 is made of a plastic material, and has the object-side surface 351 and the image-side surface 352 being both aspheric. Furthermore, the image-side surface 352 of the fifth lens element 350 includes at least one convex critical point in an off-axial region thereof.

The sixth lens element 360 with negative refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Furthermore, the image-side surface 362 of the sixth lens element 360 includes at least one convex critical point in an off-axial region thereof.

The IR-cut filter 370 is made of a glass material and located between the sixth lens element 360 and the image surface 380, and will not affect the focal length of the imaging optical lens system.

Figure 5B:
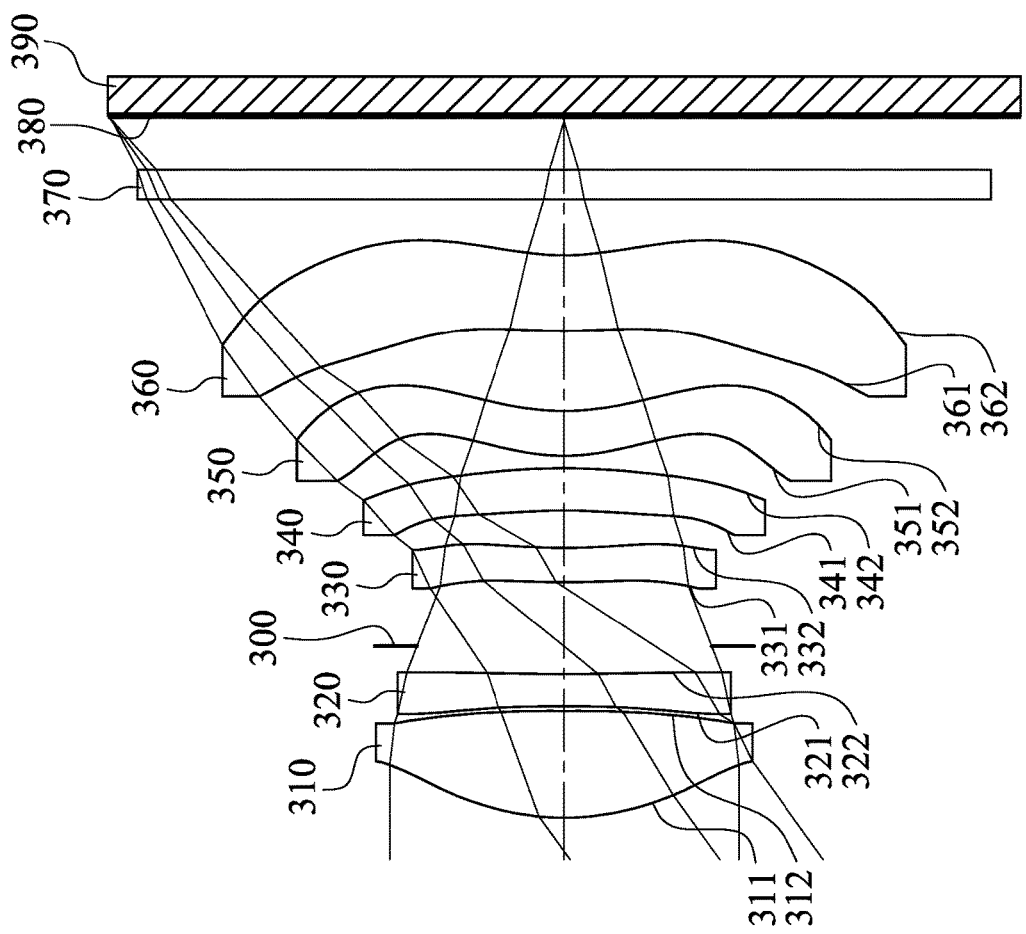
FIG. 5B is another schematic view of the image capturing apparatus according to the 3rd embodiment.
Figure 5C:
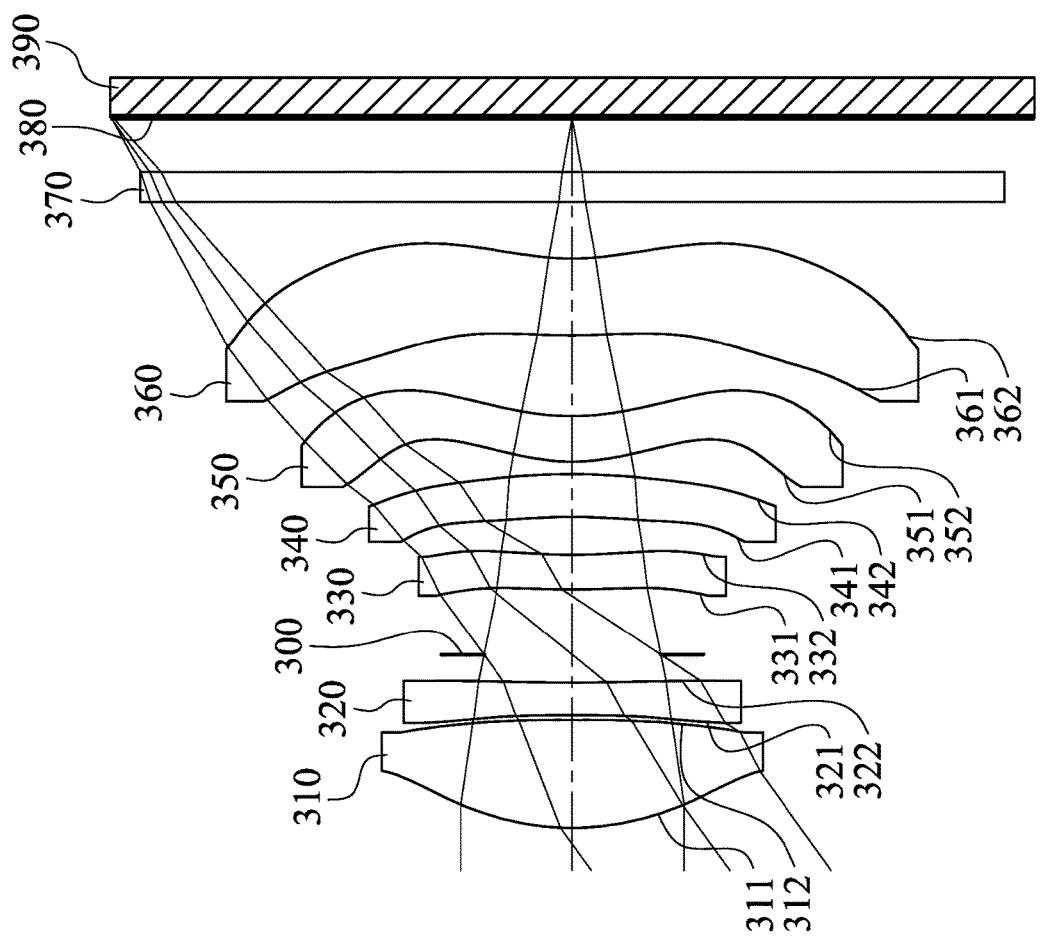
FIG. 5C is further another schematic view of the image capturing apparatus according to the 3rd embodiment.
Figure 6B:
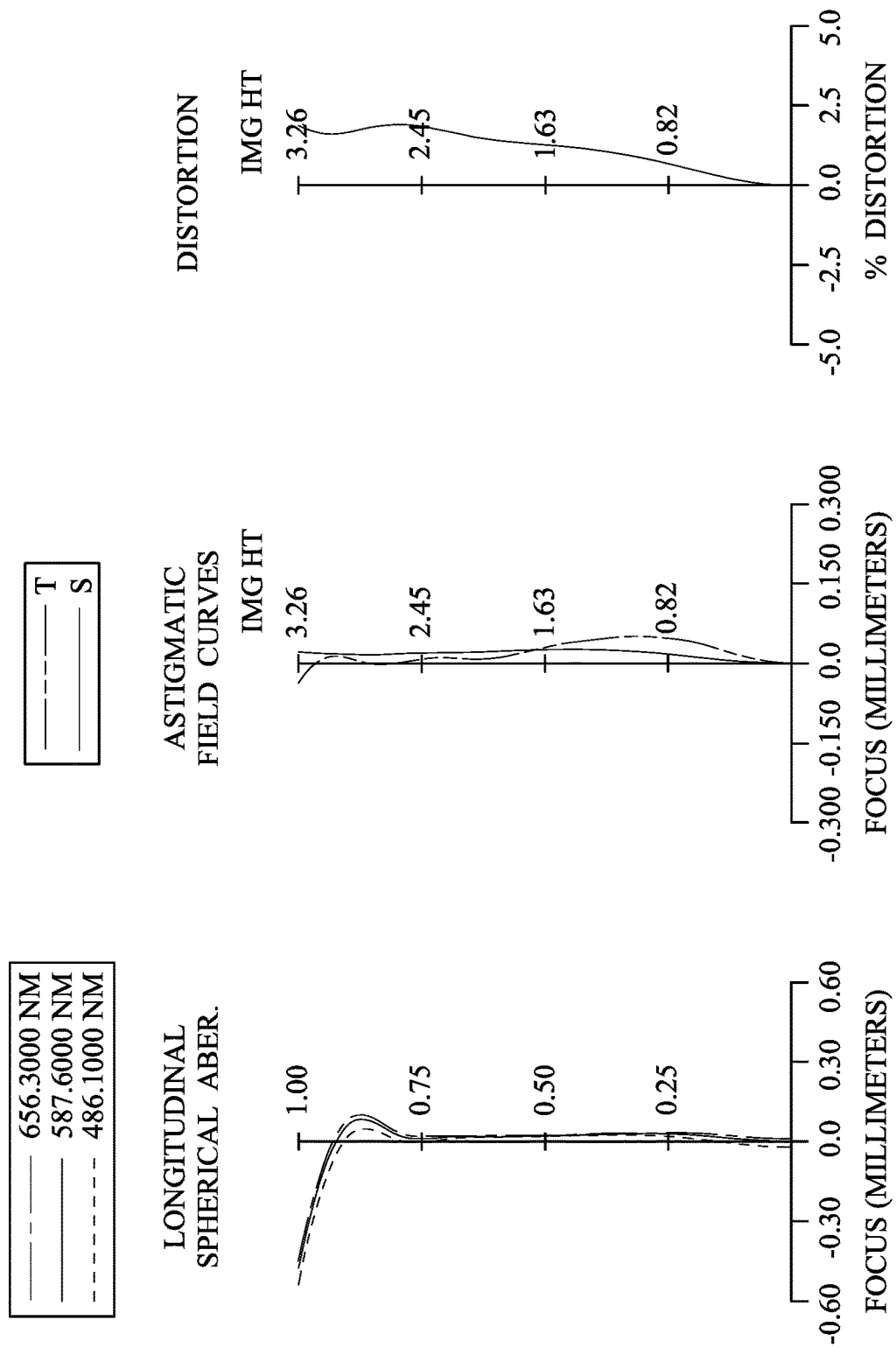
FIG. 6B shows spherical aberration curves, astigmatic field curves and a distortion curve of the image capturing apparatus according to FIG. 5B.
Figure 6C:
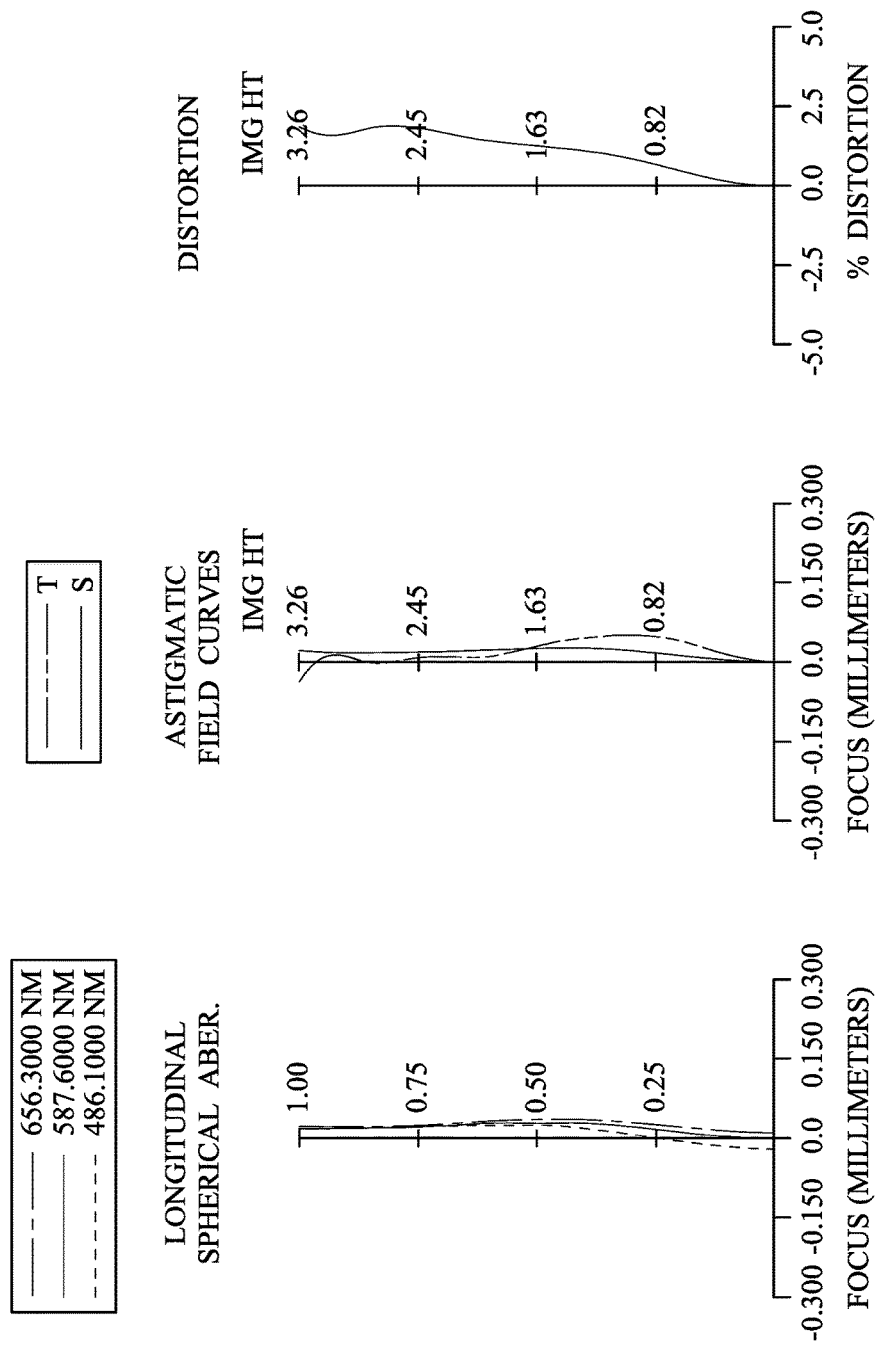
FIG. 6C shows spherical aberration curves, astigmatic field curves and a distortion curve of the image capturing apparatus according to FIG. 5C.

FIG. 5B is another schematic view of the image capturing apparatus according to the 3rd embodiment. FIG. 6B shows, in order from left to right, spherical aberration curves, astigmatic field curves and a distortion curve of the image capturing apparatus according to FIG. 5B. FIG. 5C is further another schematic view of the image capturing apparatus according to the 3rd embodiment. FIG. 6C shows, in order from left to right, spherical aberration curves, astigmatic field curves and a distortion curve of the image capturing apparatus according to FIG. 5C. In FIG. 5A, FIG. 5B and FIG. 5C, the aperture stop 300 is an adjustable stop. When an f-number of the imaging optical lens system is Fno, the value of the parameter Fno in the 3rd embodiment can be adjusted to 1.68 (corresponding to FIG. 5B), 2.00 (corresponding to FIG. 5A) and 2.80 (corresponding to FIG. 5C).

The detailed optical data of the 3rd embodiment are shown in TABLE 5 and the aspheric surface data are shown in TABLE 6 below.

TABLE 5

3rd Embodiment
f = 4.41 mm, Fno = 2.00*, HFOV = 35.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.885 | ASP | 0.761 | Plastic | 1.544 | 55.9 | 3.69 |
| 2 | | 26.370 | ASP | 0.034 | | | | |
| 3 | Lens 2 | 316.487 | ASP | 0.230 | Plastic | 1.660 | 20.4 | −17.62 |
| 4 | | 11.215 | ASP | 0.200 | | | | |
| 5 | Ape. Stop | Plano | | 0.461 | | | | |
| 6 | Lens 3 | 5.799 | ASP | 0.245 | Plastic | 1.660 | 20.4 | −24.64 |
| 7 | | 4.203 | ASP | 0.267 | | | | |
| 8 | Lens 4 | −3.924 | ASP | 0.302 | Plastic | 1.639 | 23.5 | −31.82 |
| 9 | | −5.009 | ASP | 0.088 | | | | |
| 10 | Lens 5 | 1.442 | ASP | 0.321 | Plastic | 1.544 | 55.9 | 9.42 |
| 11 | | 1.851 | ASP | 0.573 | | | | |
| 12 | Lens 6 | 4.384 | ASP | 0.542 | Plastic | 1.515 | 56.5 | −6.67 |
| 13 | | 1.844 | ASP | 0.400 | | | | |
| 14 | IR-cut filter | Plano | | 0.210 | Glass | 1.517 | 64.2 | — |
| 15 | | Plano | | 0.386 | | | | |
| 16 | Image | Plano | | — | | | | |

Reference wavelength is 587.6 nm (d-line).

Effective radius of Surface 2 is 1.212 mm.

Effective radius of Surface 7 is 1.085 mm.

*The aperture stop 300 of Surface 5 is the adjustable stop, and the value of the parameter Fno in the 3rd embodiment can be adjusted to 1.68 (corresponding to FIG. 5B), 2.00 (corresponding to FIG. 5A) and 2.80 (corresponding to FIG. 5C).

TABLE 6

Aspheric Coefficients

| | Surface # | | | | | |
|---|---|---|---|---|---|---|
| | 1 | 2 | 3 | 4 | 6 | 7 |
| k = | −4.7444E−01 | −5.7676E+01 | −8.7432E+00 | −1.3161E+01 | 1.1664E+01 | 2.3245E+00 |
| A4 = | −1.2016E−02 | −2.9040E−01 | −3.0731E−01 | −9.8478E−02 | −1.7574E−01 | −1.1801E−01 |
| A6 = | 3.6421E−02 | 5.5183E−01 | 6.5169E−01 | 1.9477E−01 | −2.3382E−02 | −7.9940E−02 |
| A8 = | −8.4664E−02 | −5.8352E−01 | −7.2052E−01 | −2.2763E−01 | 2.6829E−02 | 9.2615E−02 |
| A10 = | 8.6548E−02 | 3.4764E−01 | 4.5189E−01 | 1.2755E−01 | 2.4435E−02 | −8.0446E−02 |
| A12 = | −4.7134E−02 | −1.1272E−01 | −1.5068E−01 | −2.6565E−02 | | 5.0805E−02 |
| A14 = | 9.3340E−03 | 1.5899E−02 | 2.1963E−02 | | | |

| | Surface # | | | | | |
|---|---|---|---|---|---|---|
| | 8 | 9 | 10 | 11 | 12 | 13 |
| k = | −1.0362E+01 | −4.1494E+00 | −7.8456E+00 | −1.1923E+00 | 0.0000E+00 | −7.8018E+00 |
| A4 = | 1.7720E−01 | −3.2251E−02 | 3.6103E−03 | −9.2687E−02 | −2.6358E−01 | −1.3642E−01 |
| A6 = | −1.9197E−01 | 1.1003E−01 | −1.2189E−01 | −1.6031E−01 | 1.4129E−01 | 6.4517E−02 |
| A8 = | 1.1731E−01 | −8.5280E−02 | 9.4385E−02 | −1.1038E−02 | −4.6623E−02 | −2.4513E−02 |
| A10 = | −1.0619E−01 | −3.6002E−03 | −6.7215E−02 | 1.0638E−02 | 1.3389E−02 | 5.9165E−03 |
| A12 = | 3.8757E−02 | 2.0821E−02 | 2.5649E−02 | −3.4537E−03 | −3.2976E−03 | −7.2145E−04 |
| A14 = | | −4.9721E−03 | −3.4205E−03 | 4.4569E−04 | 4.8175E−04 | 2.5779E−05 |
| A16 = | | | | −1.6455E−05 | −2.8149E−05 | 1.0844E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f(mm) | 4.41 | BL/T23 | 1.51 |
| Fno | 1.68 (FIG. 5B) | TL/ImgH | 1.54 |
| | 2.00 (FIG. 5A) | (|Sag21| + |Sag22|)/CT2 | 0.30 |
| | 2.80 (FIG. 5C) | f/T23 | 6.67 |
| HFOV (deg.) | 35.8 | V2 + V3 | 40.8 |
| EPDmin/EPDmax | 0.60 | YV6R2/YV5R2 | 0.87 |
| (R3 + R4)/(R3 − R4) | 1.07 | YV6R2/EPDmax | 0.39 |
| f/|R4| | 0.39 | | |
| T23/(CT2 + CT3) | 1.39 | | |
| CT6/T56 | 0.95 | | |

Furthermore, in the imaging optical lens system according to the 3rd embodiment, when a focal length of the first lens element 310 is f1, a focal length of the second lens element 320 is f2, a focal length of the third lens element 330 is f3, a focal length of the fourth lens element 340 is f4, a focal length of the fifth lens element 350 is f5, and a focal length of the sixth lens element 360 is f6, the following conditions are satisfied: |f1|<|f2|; |f1|<|f3|; |f1|<|f4|; |f1|<|f5|; and |f1|<|f6|.

4th Embodiment

Figure 7:
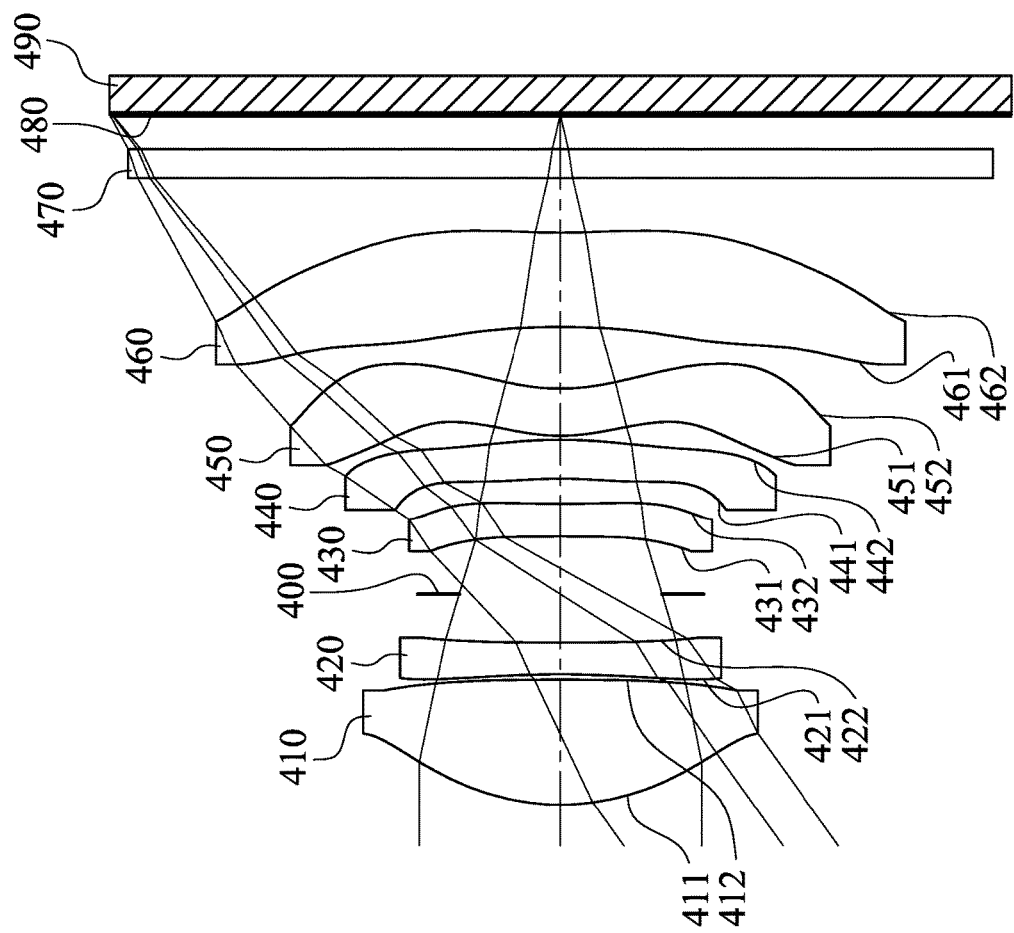
FIG. 7 is a schematic view of an image capturing apparatus according to the 4th embodiment of the present disclosure.
Figure 8:
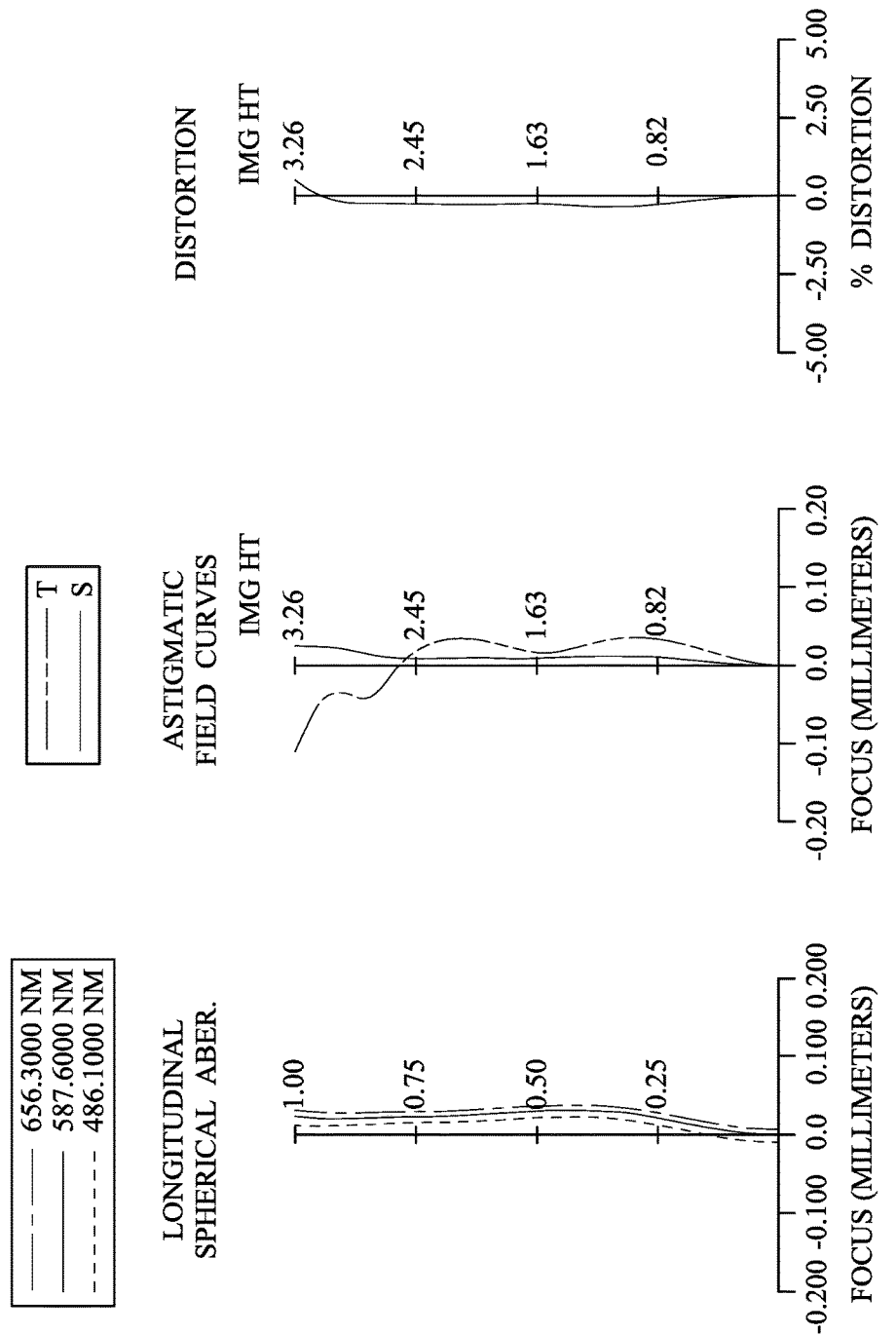
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows, in order from left to right, spherical aberration curves, astigmatic field curves and a distortion curve of the image capturing apparatus according to the 4th embodiment. In FIG. 7, the image capturing apparatus includes the imaging optical lens system (its reference numeral is omitted) and an image sensor 490. The imaging optical lens system includes, in order from an object side to an image side, a first lens element 410, a second lens element 420, an aperture stop 400, a third lens element 430, a fourth lens element 440, a fifth lens element 450, a sixth lens element 460, an IR-cut filter 470 and an image surface 480. The image sensor 490 is disposed on the image surface 480 of the imaging optical lens system. There is an air gap and no relative movement between every two of the first lens element 410, the second lens element 420, the third lens element 430, the fourth lens element 440, the fifth lens element 450 and the sixth lens element 460 that are adjacent to each other. The imaging optical lens system includes six lens elements (410-460) without additional one or more lens elements inserted between the first lens element 410 and the sixth lens element 460.

The first lens element 410 with positive refractive power has an object-side surface 411 being convex in a paraxial region thereof and an image-side surface 412 being convex in a paraxial region thereof. The first lens element 410 is made of a plastic material, and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of a plastic material, and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of a plastic material, and has the object-side surface 431 and the image-side surface 432 being both aspheric. Furthermore, the image-side surface 432 of the third lens element 430 includes at least one convex shape in an off-axial region thereof.

The fourth lens element 440 with negative refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric.

The fifth lens element 450 with positive refractive power has an object-side surface 451 being convex in a paraxial region thereof and an image-side surface 452 being concave in a paraxial region thereof. The fifth lens element 450 is made of a plastic material, and has the object-side surface 451 and the image-side surface 452 being both aspheric. Furthermore, the image-side surface 452 of the fifth lens element 450 includes at least one convex critical point in an off-axial region thereof.

The sixth lens element 460 with negative refractive power has an object-side surface 461 being concave in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one convex critical point in an off-axial region thereof.

The IR-cut filter 470 is made of a glass material and located between the sixth lens element 460 and the image surface 480, and will not affect the focal length of the imaging optical lens system.

The detailed optical data of the 4th embodiment are shown in TABLE 7 and the aspheric surface data are shown in TABLE 8 below.

TABLE 7

4th Embodiment
f = 4.51 mm, Fno = 2.20, HFOV = 35.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.749 | ASP | 0.910 | Plastic | 1.544 | 55.9 | 2.99 |
| 2 | | −18.752 | ASP | 0.038 | | | | |
| 3 | Lens 2 | −6.702 | ASP | 0.230 | Plastic | 1.660 | 20.4 | −9.51 |
| 4 | | 99.951 | ASP | 0.352 | | | | |
| 5 | Ape. Stop | Plano | | 0.419 | | | | |
| 6 | Lens 3 | −131.575 | ASP | 0.240 | Plastic | 1.660 | 20.4 | −15.40 |
| 7 | | 11.021 | ASP | 0.182 | | | | |
| 8 | Lens 4 | −3.368 | ASP | 0.283 | Plastic | 1.660 | 20.4 | −122.46 |
| 9 | | −3.632 | ASP | 0.030 | | | | |
| 10 | Lens 5 | 1.415 | ASP | 0.342 | Plastic | 1.584 | 28.2 | 12.51 |
| 11 | | 1.599 | ASP | 0.446 | | | | |
| 12 | Lens 6 | −7.662 | ASP | 0.686 | Plastic | 1.584 | 28.2 | −5.75 |
| 13 | | 6.190 | ASP | 0.400 | | | | |
| 14 | IR-cut filter | Plano | | 0.210 | Glass | 1.517 | 64.2 | — |
| 15 | | Plano | | 0.251 | | | | |
| 16 | Image | Plano | | — | | | | |

Reference wavelength is 587.6 nm (d-line).
Effective radius of Surface 2 is 1.280 mm.
Effective radius of Surface 7 is 1.100 mm.

TABLE 8

Aspheric Coefficients

| | Surface # | | | | | |
|---|---|---|---|---|---|---|
| | 1 | 2 | 3 | 4 | 6 | 7 |
| k = | −3.1870E−01 | −3.6955E+01 | −1.1693E+01 | −9.0000E+01 | −1.6805E+01 | 1.9417E+01 |
| A4 = | −9.8001E−03 | −5.5363E−03 | 4.4089E−02 | 5.1098E−02 | −1.2752E−01 | −5.8507E−02 |
| A6 = | 2.9608E−02 | −5.3724E−03 | −2.2122E−02 | −3.9855E−02 | −6.6368E−02 | −1.3631E−01 |
| A8 = | −6.4149E−02 | −2.3741E−03 | 8.1203E−03 | 2.5319E−03 | 9.4965E−02 | 6.6818E−03 |
| A10 = | 6.2208E−02 | 5.6588E−03 | 5.2103E−03 | −6.7212E−03 | −4.0936E−02 | 4.7638E−02 |
| A12 = | −3.1560E−02 | −4.0519E−03 | −2.5733E−03 | 2.1410E−04 | 1.6680E−02 | 4.8764E−03 |
| A14 = | 5.6074E−03 | 9.3801E−04 | 6.4582E−04 | | | |

| | Surface # | | | | | |
|---|---|---|---|---|---|---|
| | 8 | 9 | 10 | 11 | 12 | 13 |
| k = | −5.2306E+01 | −1.4384E+01 | −8.7006E−01 | −7.1102E−01 | 4.4524E+00 | −1.3381E+00 |
| A4 = | 2.3102E−01 | 2.5070E−03 | −4.0754E−01 | −1.4911E−01 | −1.2314E−01 | −1.4648E−01 |
| A6 = | −2.3326E−01 | 1.5615E−01 | 3.1038E−01 | −5.1824E−02 | 1.5601E−01 | 8.4091E−02 |
| A8 = | 3.1077E−02 | −1.8698E−01 | −4.3012E−01 | 8.3347E−02 | −7.6144E−02 | −3.9037E−02 |
| A10 = | 6.8065E−03 | 8.5047E−02 | 3.6413E−01 | −4.1361E−02 | 1.9437E−02 | 1.2234E−02 |
| A12 = | −7.6064E−03 | −1.6536E−02 | −1.5432E−01 | 9.4553E−03 | −2.7945E−03 | −2.2638E−03 |
| A14 = | | 8.7436E−04 | 3.1866E−02 | −9.9585E−04 | 2.1849E−04 | 2.1913E−04 |
| A16 = | | | −2.5740E−03 | 3.9086E−05 | −7.3264E−06 | −8.4861E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 4.51 | BL/T23 | 1.12 |
| Fno | 2.20 | TL/ImgH | 1.54 |
| HFOV (deg.) | 35.6 | (|Sag21| + |Sag22|)/ | 0.27 |
| EPDmin/EPDmax | 1.00 | CT2 | |
| (R3 + R4)/(R3 − R4) | −0.87 | f/T23 | 5.85 |
| f/|R4| | 0.05 | V2 + V3 | 40.8 |
| T23/(CT2 + CT3) | 1.64 | YV6R2/YV5R2 | 0.52 |
| CT6/T56 | 1.54 | YV6R2/EPDmax | 0.30 |

Furthermore, in the imaging optical lens system according to the 4th embodiment, when a focal length of the first lens element 410 is f1, a focal length of the second lens element 420 is f2, a focal length of the third lens element 430 is f3, a focal length of the fourth lens element 440 is f4, a focal length of the fifth lens element 450 is f5, and a focal length of the sixth lens element 460 is f6, the following conditions are satisfied: |f1|<|f2|; |f1|<|f3|; |f1|<|f4|; |f1|<|f5|; and |f1|<|f6|.

5th Embodiment

Figure 9:
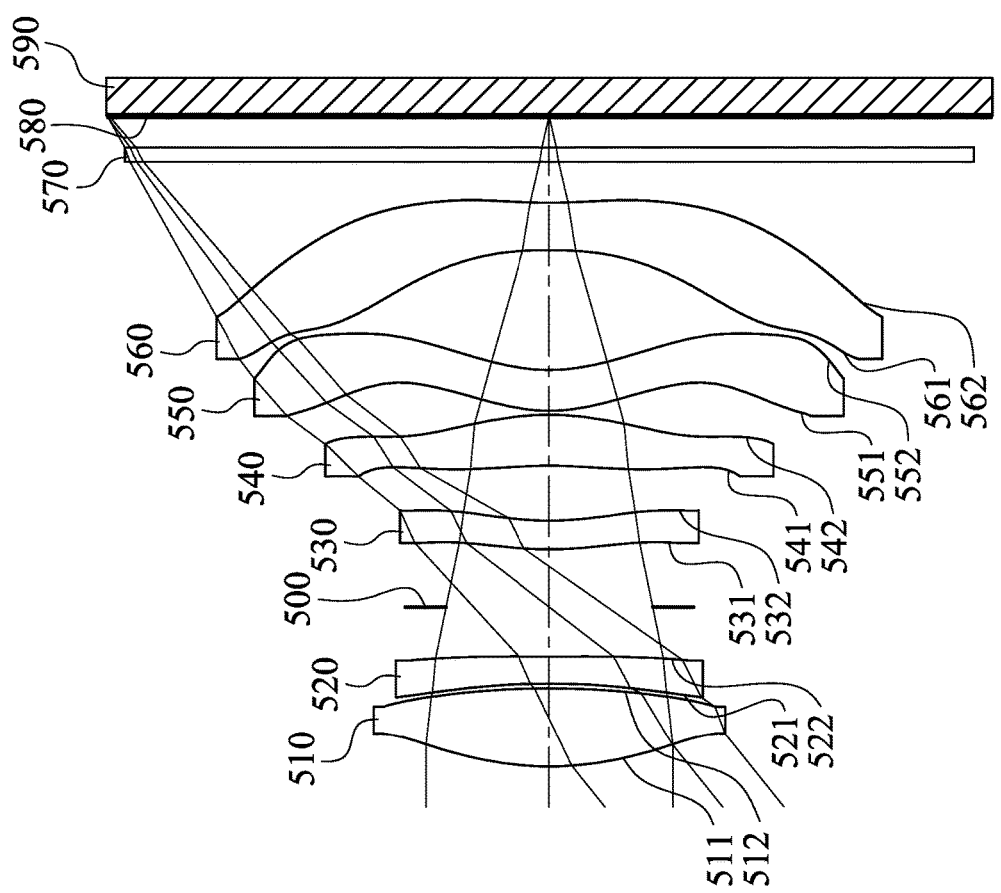
FIG. 9 is a schematic view of an image capturing apparatus according to the 5th embodiment of the present disclosure.
Figure 10:
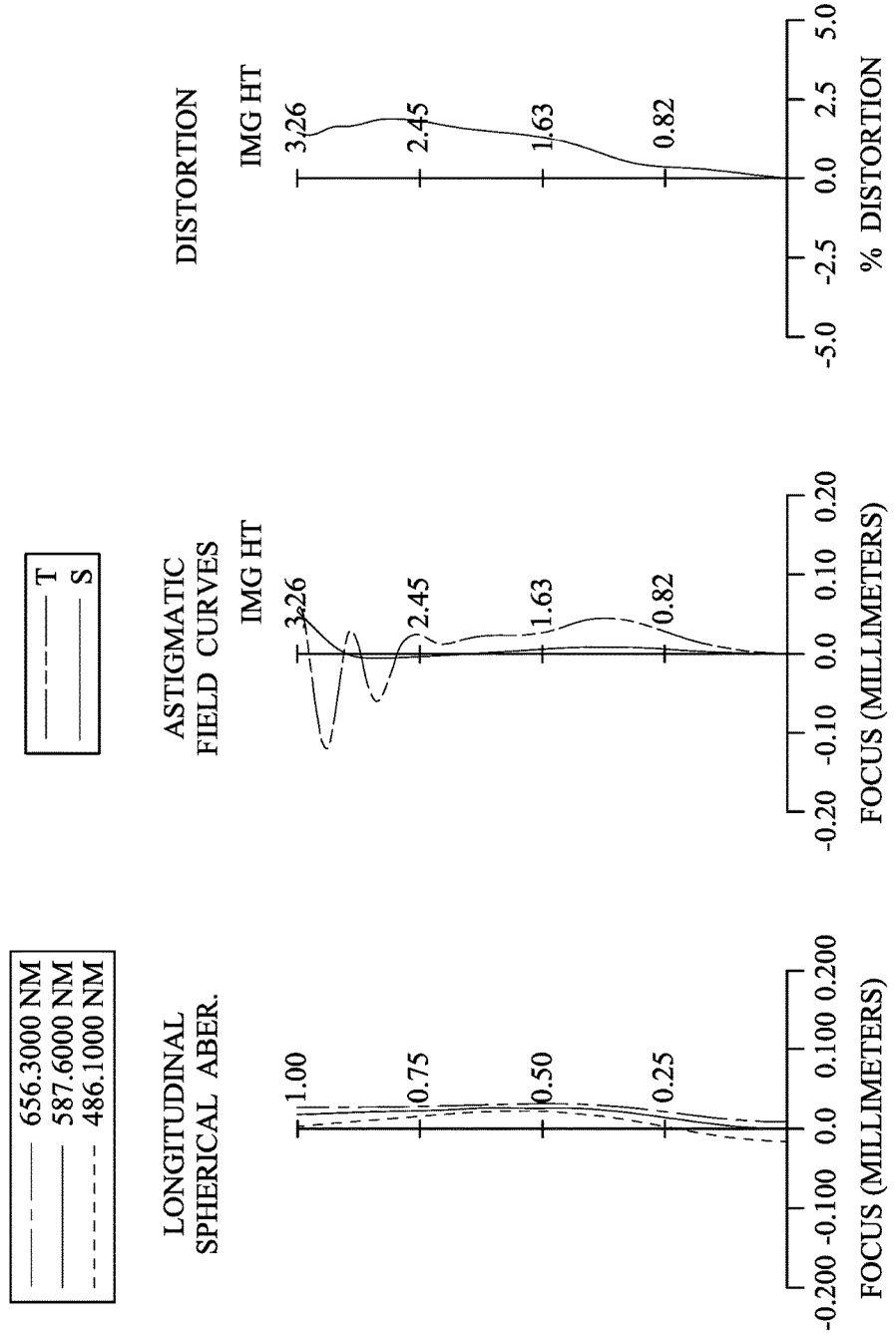
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows, in order from left to right, spherical aberration curves, astigmatic field curves and a distortion curve of the image capturing apparatus according to the 5th embodiment. In FIG. 9, the image capturing apparatus includes the imaging optical lens system (its reference numeral is omitted) and an image sensor 590. The imaging optical lens system includes, in order from an object side to an image side, a first lens element 510, a second lens element 520, an aperture stop 500, a third lens element 530, a fourth lens element 540, a fifth lens element 550, a sixth lens element 560, an IR-cut filter 570 and an image surface 580. The image sensor 590 is disposed on the image surface 580 of the imaging optical lens system. There is an air gap and no relative movement between every two of the first lens element 510, the second lens element 520, the third lens element 530, the fourth lens element 540, the fifth lens element 550 and the sixth lens element 560 that are adjacent to each other. The imaging optical lens system includes six lens elements (510-560) without additional one or more lens elements inserted between the first lens element 510 and the sixth lens element 560.

The first lens element 510 with positive refractive power has an object-side surface 511 being convex in a paraxial region thereof and an image-side surface 512 being convex in a paraxial region thereof. The first lens element 510 is made of a plastic material, and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of a plastic material, and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric. Furthermore, the image-side surface 532 of the third lens element 530 includes at least one convex shape in an off-axial region thereof.

The fourth lens element 540 with positive refractive power has an object-side surface 541 being concave in a paraxial region thereof and an image-side surface 542 being convex in a paraxial region thereof. The fourth lens element 540 is made of a plastic material, and has the object-side surface 541 and the image-side surface 542 being both aspheric.

The fifth lens element 550 with positive refractive power has an object-side surface 551 being convex in a paraxial region thereof and an image-side surface 552 being concave in a paraxial region thereof. The fifth lens element 550 is made of a plastic material, and has the object-side surface 551 and the image-side surface 552 being both aspheric. Furthermore, the image-side surface 552 of the fifth lens element 550 includes at least one convex critical point in an off-axial region thereof.

The sixth lens element 560 with negative refractive power has an object-side surface 561 being concave in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one convex critical point in an off-axial region thereof.

The IR-cut filter 570 is made of a glass material and located between the sixth lens element 560 and the image surface 580, and will not affect the focal length of the imaging optical lens system.

The detailed optical data of the 5th embodiment are shown in TABLE 9 and the aspheric surface data are shown in TABLE 10 below.

TABLE 9

5th Embodiment
f = 4.00 mm, Fno = 2.20, HFOV = 38.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.348 | ASP | 0.578 | Plastic | 1.544 | 55.9 | 3.48 |
| 2 | | −8.932 | ASP | 0.034 | | | | |

TABLE 9-continued

5th Embodiment
f = 4.00 mm, Fno = 2.20, HFOV = 38.6 deg.

| Surface # | | Curvature Radius | | Thickness | Material | Index | Abbe # | Focal Length |
|---|---|---|---|---|---|---|---|---|
| 3 | Lens 2 | −8.795 | ASP | 0.200 | Plastic | 1.660 | 20.4 | −10.49 |
| 4 | | 32.858 | ASP | 0.365 | | | | |
| 5 | Ape. Stop | Plano | | 0.425 | | | | |
| 6 | Lens 3 | 2.702 | ASP | 0.211 | Plastic | 1.660 | 20.4 | −42.56 |
| 7 | | 2.388 | ASP | 0.404 | | | | |
| 8 | Lens 4 | −3.311 | ASP | 0.379 | Plastic | 1.544 | 55.9 | 9.50 |
| 9 | | −2.099 | ASP | 0.030 | | | | |
| 10 | Lens 5 | 1.283 | ASP | 0.300 | Plastic | 1.544 | 55.9 | 16.08 |
| 11 | | 1.380 | ASP | 0.881 | | | | |
| 12 | Lens 6 | −3.965 | ASP | 0.350 | Plastic | 1.515 | 56.5 | −3.84 |
| 13 | | 4.048 | ASP | 0.300 | | | | |
| 14 | IR-cut filter | Plano | | 0.110 | Glass | 1.517 | 64.2 | — |
| 15 | | Plano | | 0.233 | | | | |
| 16 | Image | Plano | | — | | | | |

Reference wavelength is 587.6 nm (d-line).
Effective radius of Surface 2 is 1.220 mm.
Effective radius of Surface 7 is 1.100 mm.

TABLE 10

Aspheric Coefficients

| | Surface # | | | | | |
|---|---|---|---|---|---|---|
| | 1 | 2 | 3 | 4 | 6 | 7 |
| k = | −4.8922E−01 | 0.0000E+00 | 0.0000E+00 | 0.0000E+00 | 0.0000E+00 | 0.0000E+00 |
| A4 = | −2.1023E−02 | −1.6585E−01 | −2.1045E−01 | −1.0134E−01 | −1.6112E−01 | −1.1948E−01 |
| A6 = | 2.3467E−02 | 4.1162E−01 | 5.6250E−01 | 1.9893E−01 | −6.6689E−02 | −1.3031E−01 |
| A8 = | −7.3432E−02 | −5.0006E−01 | −7.6343E−01 | −3.3478E−01 | 9.5424E−02 | 1.7740E−01 |
| A10 = | 8.5449E−02 | 3.2414E−01 | 5.6619E−01 | 3.1833E−01 | −2.4870E−02 | −1.3006E−01 |
| A12 = | −4.9748E−02 | −1.1115E−01 | −2.1660E−01 | −1.5285E−01 | 1.5044E−02 | 6.6738E−02 |
| A14 = | 9.9745E−03 | 1.5663E−02 | 3.4546E−02 | 3.0052E−02 | −4.5253E−03 | −1.0637E−02 |

| | Surface # | | | | | |
|---|---|---|---|---|---|---|
| | 8 | 9 | 10 | 11 | 12 | 13 |
| k = | −8.6612E+01 | −1.3990E+01 | −1.0000E+00 | −1.0243E+00 | −3.3931E+00 | −3.9780E+00 |
| A4 = | 8.8861E−02 | −6.7762E−02 | −2.7696E−01 | −1.9451E−01 | −2.8196E−01 | −2.6409E−01 |
| A6 = | −1.2874E−02 | 6.9245E−02 | 1.6298E−01 | 8.9315E−02 | 3.0475E−01 | 2.1247E−01 |
| A8 = | −2.0338E−02 | 5.5117E−02 | −1.1021E−01 | −4.6748E−02 | −2.0642E−01 | −1.1067E−01 |
| A10 = | 6.4553E−03 | −7.1194E−02 | 4.2739E−02 | 1.4703E−02 | 8.7753E−02 | 3.4139E−02 |
| A12 = | −1.5794E−03 | 2.4970E−02 | −7.8456E−03 | −1.4563E−03 | −2.1018E−02 | −6.0504E−03 |
| A14 = | | −3.0087E−03 | 5.7013E−04 | −2.0035E−04 | 2.5604E−03 | 5.6826E−04 |
| A16 = | | | −5.8819E−06 | 3.4529E−05 | −1.2321E−04 | −2.1826E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 4.00 | BL/T23 | 0.81 |
| Fno | 2.20 | TL/ImgH | 1.47 |
| HFOV (deg.) | 38.6 | (|Sag21| + |Sag22|)/ | 0.65 |
| EPDmin/EPDmax | 1.00 | CT2 | |

-continued

| 5th Embodiment | | | |
|---|---|---|---|
| (R3 + R4)/(R3 − R4) | −0.58 | f/T23 | 5.06 |
| f/|R4| | 0.12 | V2 + V3 | 40.8 |
| T23/(CT2 + CT3) | 1.92 | YV6R2/YV5R2 | 0.41 |
| CT6/T56 | 0.40 | YV6R2/EPDmax | 0.32 |

Furthermore, in the imaging optical lens system according to the 5th embodiment, when a focal length of the first lens element 510 is f1, a focal length of the second lens element 520 is f2, a focal length of the third lens element 530 is f3, a focal length of the fourth lens element 540 is f4, a focal length of the fifth lens element 550 is f5, and a focal length of the sixth lens element 560 is f6, the following conditions are satisfied: |f1|<|f2|; |f1|<|f3|; |f1|<|f4|; |f1|<|f5|; and |f1|<|f6|.

6th Embodiment

Figure 11A:
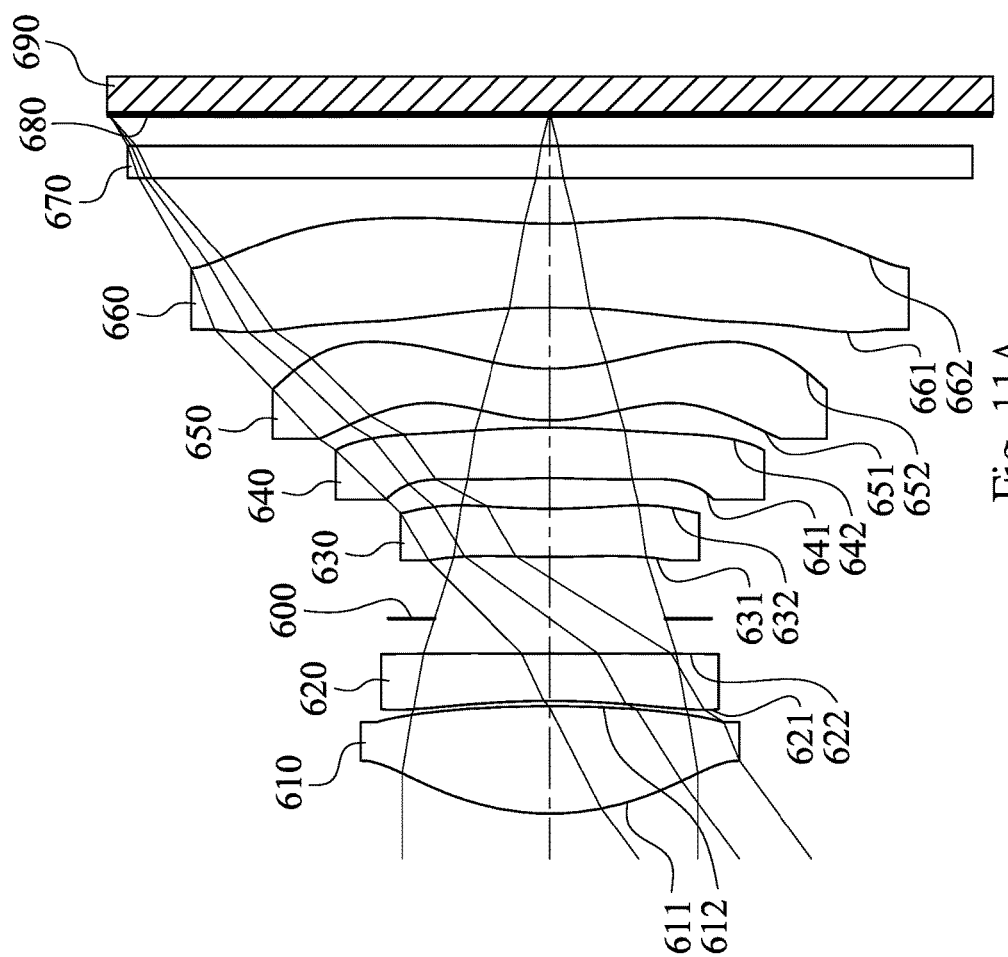
FIG. 11A is a schematic view of an image capturing apparatus according to the 6th embodiment of the present disclosure.
Figure 12A:
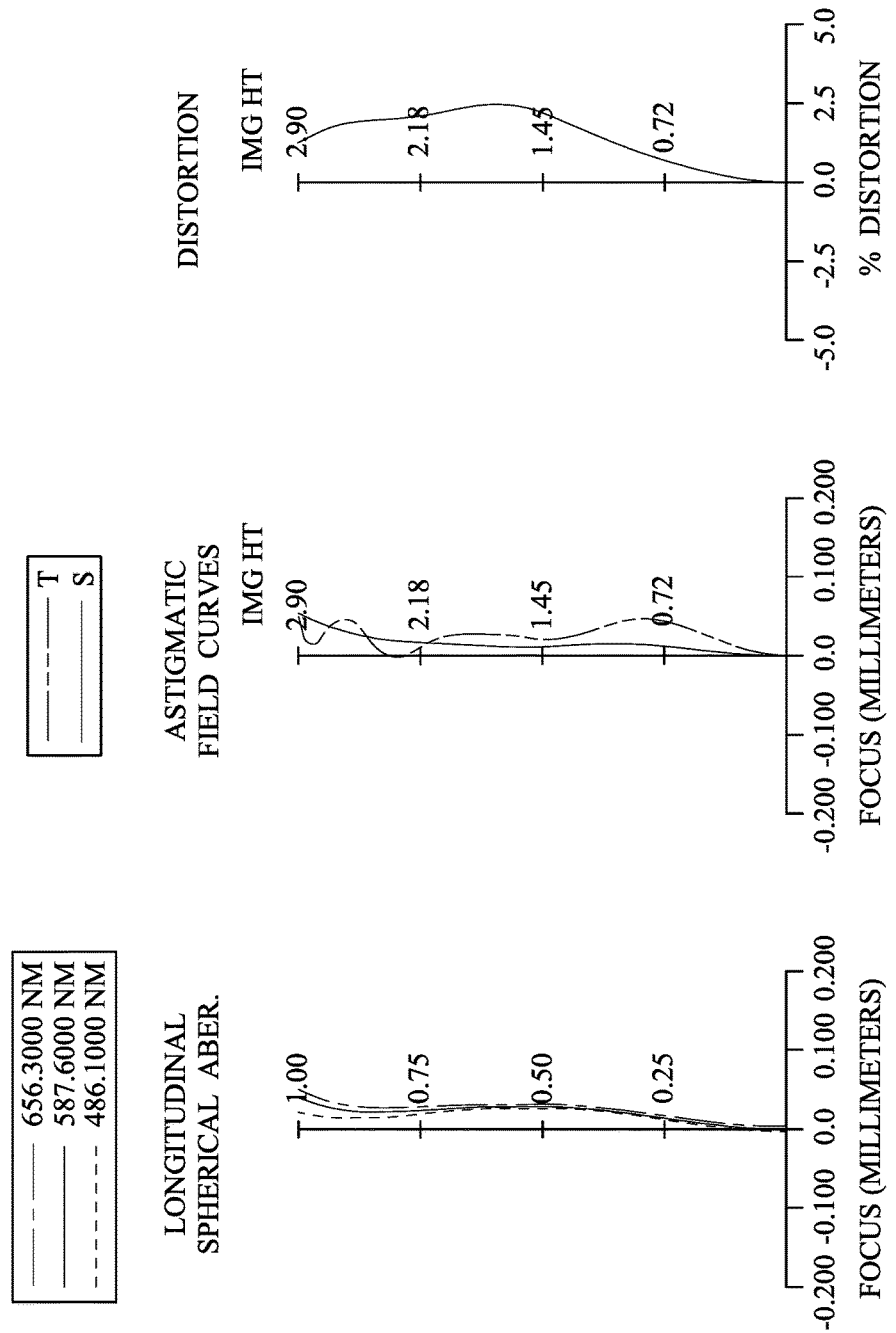
FIG. 12A shows spherical aberration curves, astigmatic field curves and a distortion curve of the image capturing apparatus according to FIG. 11A.

FIG. 11A is a schematic view of an image capturing apparatus according to the 6th embodiment of the present disclosure. FIG. 12A shows, in order from left to right, spherical aberration curves, astigmatic field curves and a distortion curve of the image capturing apparatus according to FIG. 11A. In FIG. 11A, the image capturing apparatus includes the imaging optical lens system (its reference numeral is omitted) and an image sensor 690. The imaging optical lens system includes, in order from an object side to an image side, a first lens element 610, a second lens element 620, an aperture stop 600, a third lens element 630, a fourth lens element 640, a fifth lens element 650, a sixth lens element 660, an IR-cut filter 670 and an image surface 680. The image sensor 690 is disposed on the image surface 680 of the imaging optical lens system. There is an air gap and no relative movement between every two of the first lens element 610, the second lens element 620, the third lens element 630, the fourth lens element 640, the fifth lens element 650 and the sixth lens element 660 that are adjacent to each other. The imaging optical lens system includes six lens elements (610-660) without additional one or more lens elements inserted between the first lens element 610 and the sixth lens element 660.

The first lens element 610 with positive refractive power has an object-side surface 611 being convex in a paraxial region thereof and an image-side surface 612 being convex in a paraxial region thereof. The first lens element 610 is made of a plastic material, and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of a plastic material, and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric. Furthermore, the image-side surface 632 of the third lens element 630 includes at least one convex shape in an off-axial region thereof.

The fourth lens element 640 with negative refractive power has an object-side surface 641 being concave in a paraxial region thereof and an image-side surface 642 being convex in a paraxial region thereof. The fourth lens element 640 is made of a plastic material, and has the object-side surface 641 and the image-side surface 642 being both aspheric.

The fifth lens element 650 with positive refractive power has an object-side surface 651 being convex in a paraxial region thereof and an image-side surface 652 being concave in a paraxial region thereof. The fifth lens element 650 is made of a plastic material, and has the object-side surface 651 and the image-side surface 652 being both aspheric. Furthermore, the image-side surface 652 of the fifth lens element 650 includes at least one convex critical point in an off-axial region thereof.

The sixth lens element 660 with negative refractive power has an object-side surface 661 being concave in a paraxial region thereof and an image-side surface 662 being concave in a paraxial region thereof. The sixth lens element 660 is made of a plastic material, and has the object-side surface 661 and the image-side surface 662 being both aspheric. Furthermore, the image-side surface 662 of the sixth lens element 660 includes at least one convex critical point in an off-axial region thereof.

The IR-cut filter 670 is made of a glass material and located between the sixth lens element 660 and the image surface 680, and will not affect the focal length of the imaging optical lens system.

Figure 11B:
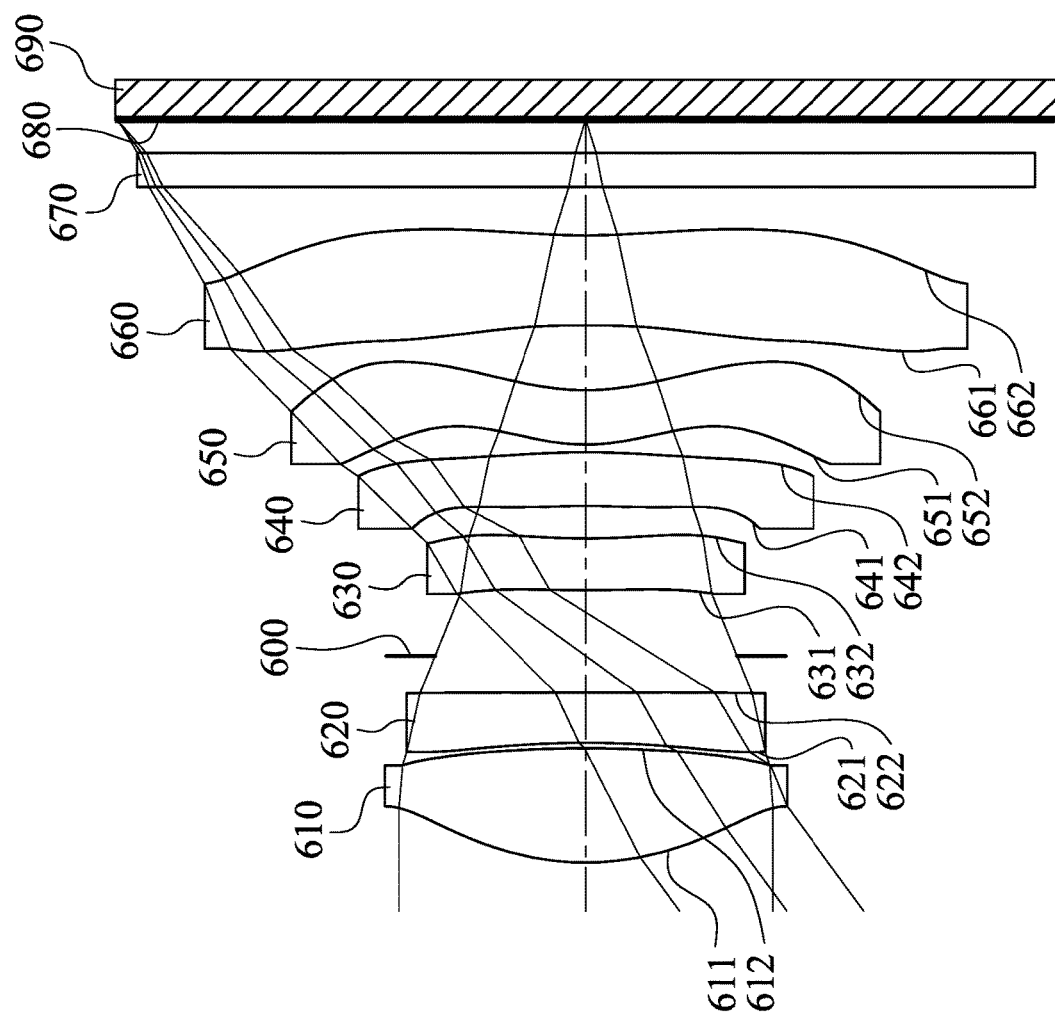
FIG. 11B is another schematic view of the image capturing apparatus according to the 6th embodiment.
Figure 11C:
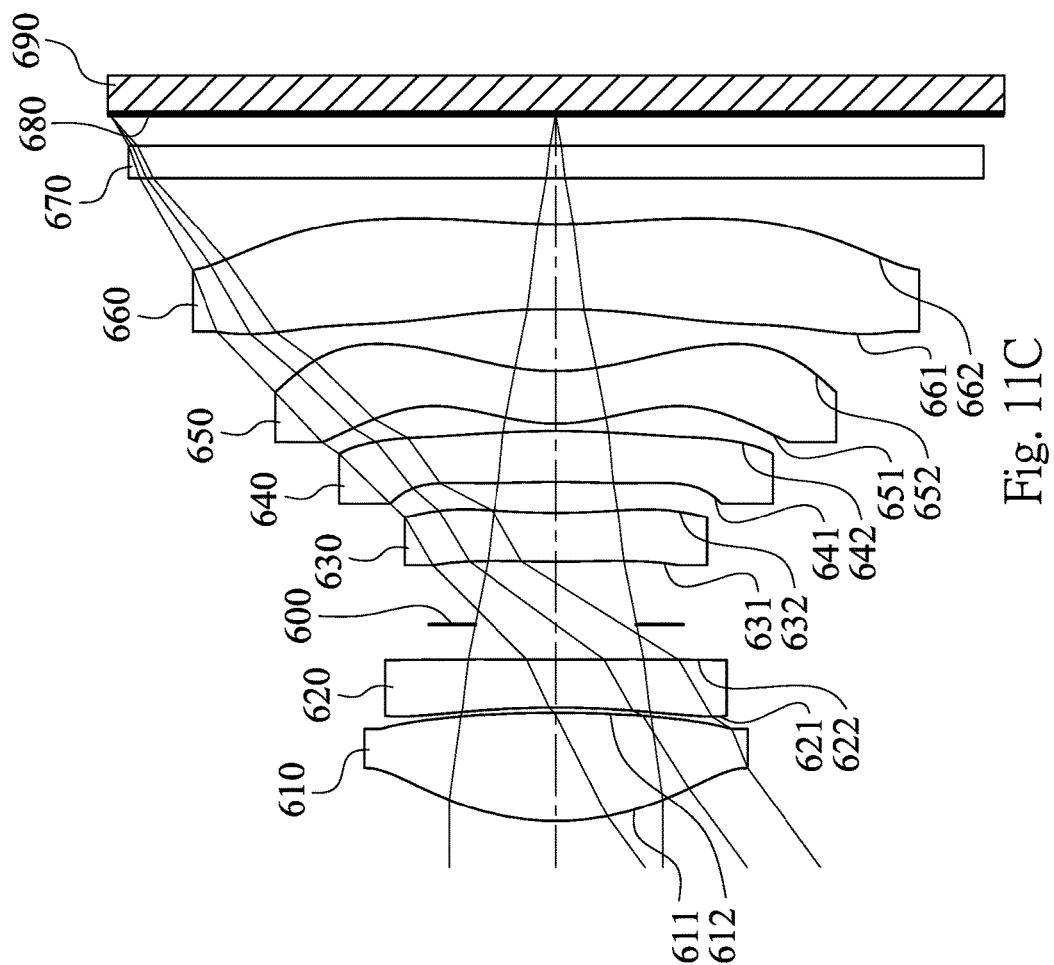
FIG. 11C is further another schematic view of the image capturing apparatus according to the 6th embodiment.
Figure 12B:
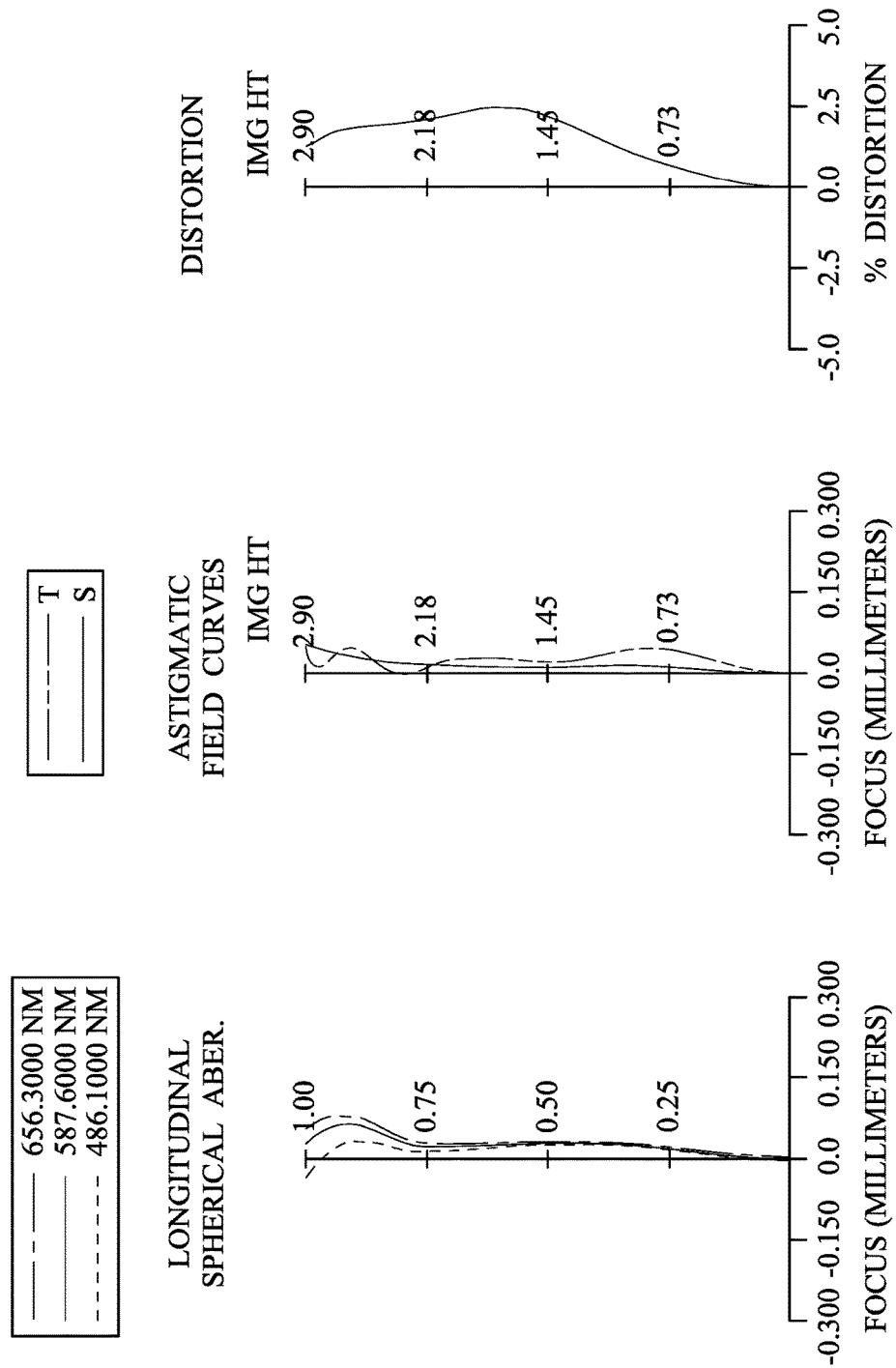
FIG. 12B shows spherical aberration curves, astigmatic field curves and a distortion curve of the image capturing apparatus according to FIG. 11B.
Figure 12C:
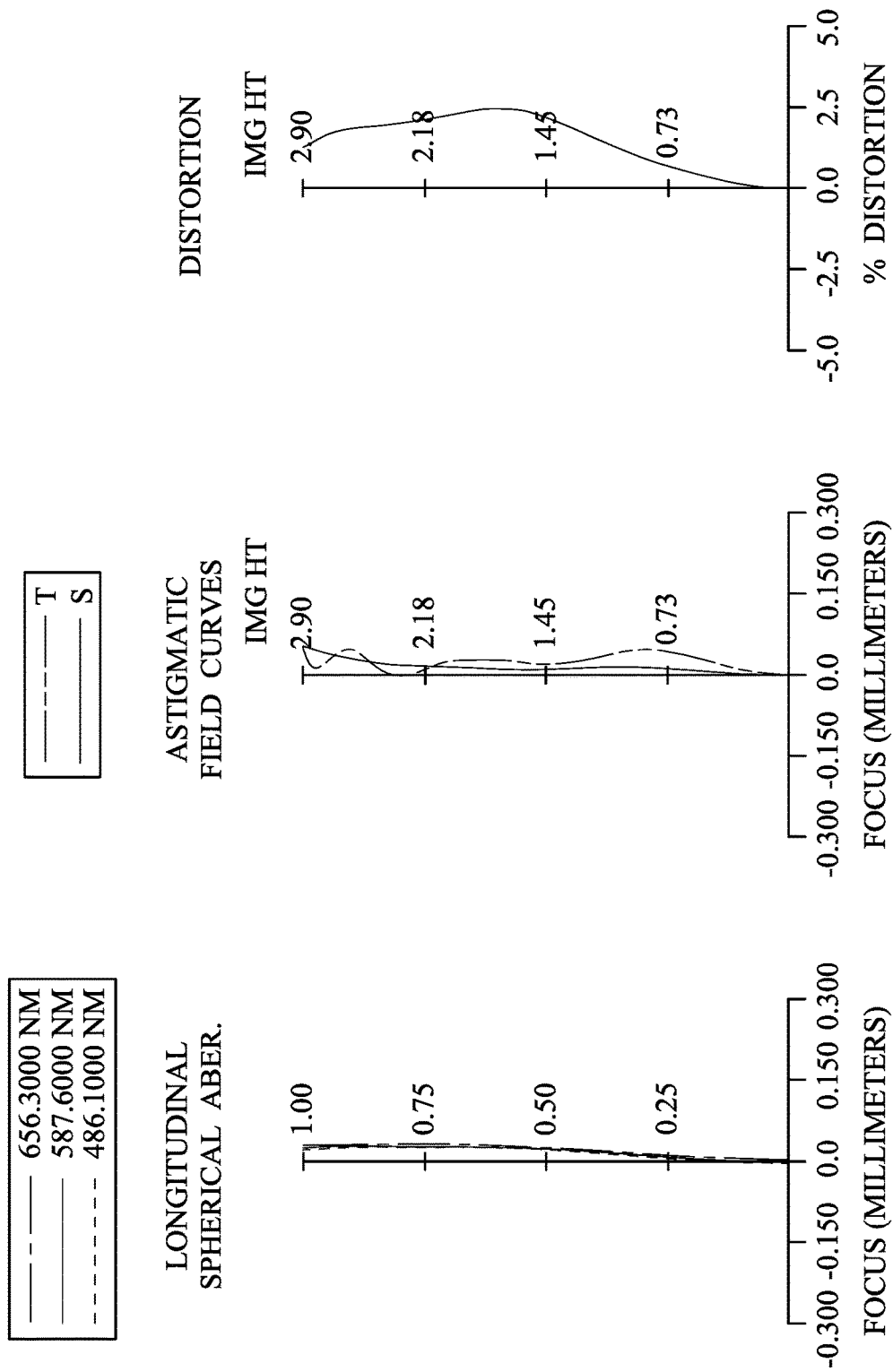
FIG. 12C shows spherical aberration curves, astigmatic field curves and a distortion curve of the image capturing apparatus according to FIG. 11C.

FIG. 11B is another schematic view of the image capturing apparatus according to the 6th embodiment. FIG. 12B shows, in order from left to right, spherical aberration curves, astigmatic field curves and a distortion curve of the image capturing apparatus according to FIG. 11B. FIG. 11C is further another schematic view of the image capturing apparatus according to the 6th embodiment. FIG. 12C shows, in order from left to right, spherical aberration curves, astigmatic field curves and a distortion curve of the image capturing apparatus according to FIG. 11C. In FIG. 11A, FIG. 11B and FIG. 11C, the aperture stop 600 is an adjustable stop. When an f-number of the imaging optical lens system is Fno, the value of the parameter Fno in the 6th embodiment can be adjusted to 1.68 (corresponding to FIG. 11B), 2.00 (corresponding to FIG. 11A) and 2.80 (corresponding to FIG. 11C).

The detailed optical data of the 6th embodiment are shown in TABLE 11 and the aspheric surface data are shown in TABLE 12 below.

TABLE 11

6th Embodiment
f = 3.88 mm, Fno = 2.00*, HFOV = 36.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.743 | ASP | 0.705 | Plastic | 1.545 | 56.0 | 2.72 |
| 2 | | −8.494 | ASP | 0.035 | | | | |
| 3 | Lens 2 | −5.661 | ASP | 0.310 | Plastic | 1.660 | 20.4 | −8.26 |
| 4 | | 151.119 | ASP | 0.228 | | | | |
| 5 | Ape. Stop | Plano | | 0.406 | | | | |
| 6 | Lens 3 | 8.404 | ASP | 0.320 | Plastic | 1.660 | 20.4 | −18.42 |
| 7 | | 4.894 | ASP | 0.201 | | | | |
| 8 | Lens 4 | −4.284 | ASP | 0.330 | Plastic | 1.584 | 28.2 | −27.29 |
| 9 | | −6.025 | ASP | 0.048 | | | | |
| 10 | Lens 5 | 1.217 | ASP | 0.340 | Plastic | 1.544 | 55.9 | 7.15 |
| 11 | | 1.597 | ASP | 0.399 | | | | |
| 12 | Lens 6 | −8.291 | ASP | 0.555 | Plastic | 1.544 | 55.9 | −4.81 |
| 13 | | 3.913 | ASP | 0.300 | | | | |

TABLE 11-continued

6th Embodiment
f = 3.88 mm, Fno = 2.00*, HFOV = 36.2 deg.

| Surface # | | Curvature Radius | Thickness | Material | Index | Abbe # | Focal Length |
|---|---|---|---|---|---|---|---|
| 14 | IR-cut filter | Plano | 0.210 | Glass | 1.517 | 64.2 | — |
| 15 | | Plano | 0.205 | | | | |
| 16 | Image | Plano | — | | | | |

Reference wavelength is 587.6 nm (d-line).
Effective radius of Surface 2 is 1.140 mm.
Effective radius of Surface 7 is 0.980 mm.
*The aperture stop 600 of Surface 5 is the adjustable stop, and the value of the parameter Fno in the 6th embodiment can be adjusted to 1.68 (corresponding to FIG. 11B), 2.00 (corresponding to FIG. 11A) and 2.80 (corresponding to FIG. 11C).

TABLE 12

Aspheric Coefficients

| Surface # | | | | | | |
|---|---|---|---|---|---|---|
| | 1 | 2 | 3 | 4 | 6 | 7 |
| k = | −4.5382E−01 | −9.0000E+01 | 1.9958E+00 | −9.0000E+01 | −1.6805E+01 | 5.2031E+00 |
| A4 = | −8.1627E−03 | −5.9576E−02 | −1.1916E−01 | −9.3985E−03 | −1.5359E−01 | −2.0535E−02 |
| A6 = | 7.9195E−03 | 1.4421E−01 | 1.3898E−01 | 6.5215E−03 | −9.9244E−02 | −4.7042E−01 |
| A8 = | −4.4040E−02 | −2.3977E−01 | −2.4349E−01 | −6.5188E−03 | 3.1238E−01 | 7.2028E−01 |
| A10 = | 6.0314E−02 | 2.0433E−01 | 2.3692E−01 | 4.3991E−03 | −3.5031E−01 | −6.4004E−01 |
| A12 = | −5.3293E−02 | −9.1395E−02 | −1.1079E−01 | −1.3500E−03 | 1.8461E−01 | 2.6838E−01 |
| A14 = | 1.4414E−02 | 1.6510E−02 | 2.1109E−02 | | | |

| Surface # | | | | | | |
|---|---|---|---|---|---|---|
| | 8 | 9 | 10 | 11 | 12 | 13 |
| k = | −3.0507E−01 | −2.1357E+00 | −9.9968E−01 | −6.6866E−01 | 4.4514E+00 | −1.8444E+00 |
| A4 = | 5.1961E−01 | 1.1583E−02 | −5.3595E−01 | −1.8029E−01 | −1.5181E−01 | −1.6390E−01 |
| A6 = | −9.4847E−01 | 1.0389E−01 | 5.4402E−01 | −4.8703E−03 | 2.4606E−01 | 1.2322E−01 |
| A8 = | 8.0282E−01 | −1.1841E−01 | −7.5407E−01 | 5.6797E−02 | −1.5437E−01 | −6.3668E−02 |
| A10 = | −1.6635E−01 | 3.7899E−02 | 6.8370E−01 | −3.7897E−02 | 5.0161E−02 | 1.9693E−02 |
| A12 = | −4.8211E−01 | 6.3462E−04 | −3.3622E−01 | 1.0774E−02 | −8.9640E−03 | −3.5393E−03 |
| A14 = | 4.0437E−01 | −1.7684E−03 | 8.3926E−02 | −1.3927E−03 | 8.4210E−04 | 3.4204E−04 |
| A16 = | −9.0955E−02 | | −8.3730E−03 | 6.7061E−05 | −3.2653E−05 | −1.3671E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 3.88 | BL/T23 | 1.13 |
| Fno | 1.68 (FIG. 11B) | TL/ImgH | 1.58 |
| | 2.00 (FIG. 11A) | (|Sag21| + |Sag22|)/CT2 | 0.20 |
| | 2.80 (FIG. 11C) | f/T23 | 6.12 |
| HFOV (deg.) | 36.2 | V2 + V3 | 40.8 |
| EPDmin/EPDmax | 0.60 | YV6R2/YV5R2 | 0.80 |
| (R3 + R4)/(R3 − R4) | −0.93 | YV6R2/EPDmax | 0.40 |
| f/|R4| | 0.03 | | |
| T23/(CT2 + CT3) | 1.01 | | |
| CT6/T56 | 1.39 | | |

Furthermore, in the imaging optical lens system according to the 6th embodiment, when a focal length of the first lens element 610 is f1, a focal length of the second lens element 620 is f2, a focal length of the third lens element 630 is f3, a focal length of the fourth lens element 640 is f4, a focal length of the fifth lens element 650 is f5, and a focal length of the sixth lens element 660 is f6, the following conditions are satisfied: |f1|<|f2|; |f1|<|f3|; |f1|<|f4|; |f1|<|f5|; and |f1|<|f6|.

7th Embodiment

Figure 13:
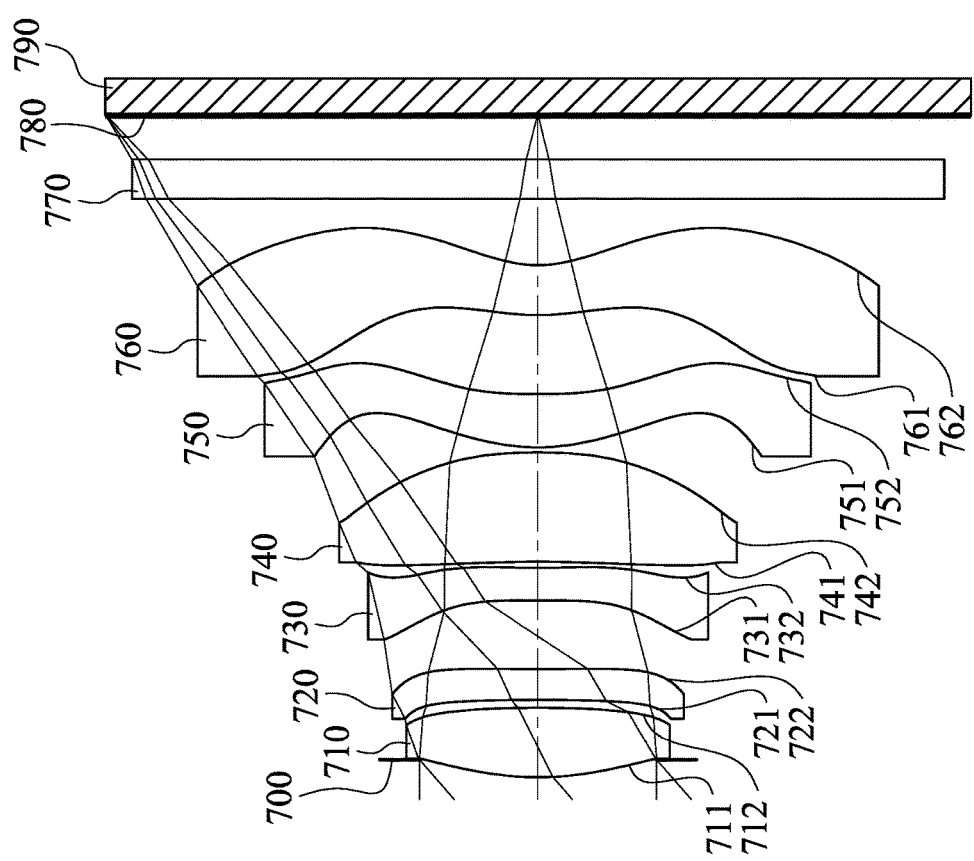
FIG. 13 is a schematic view of an image capturing apparatus according to the 7th embodiment of the present disclosure.
Figure 14:
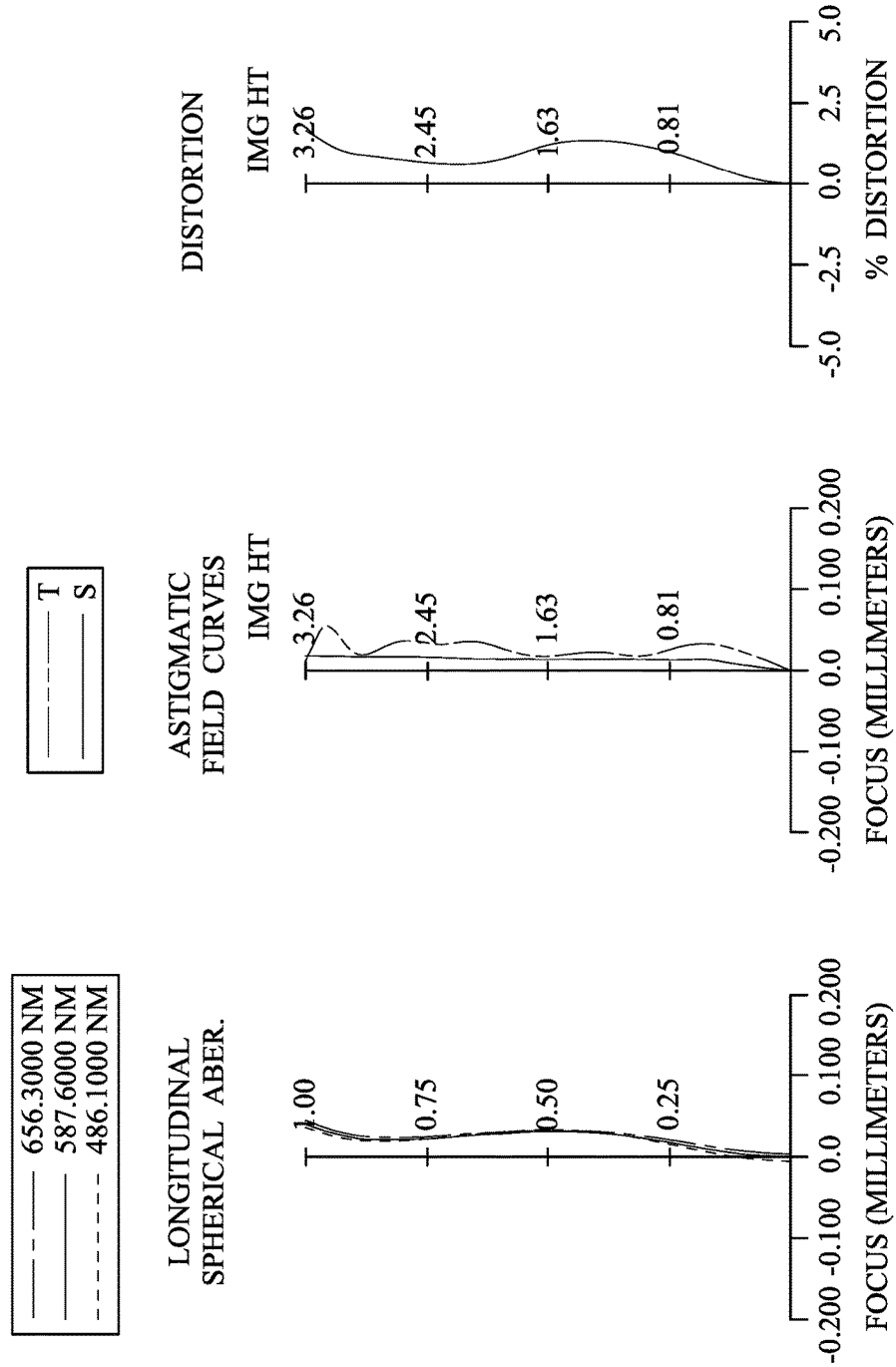
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows, in order from left to right, spherical aberration curves, astigmatic field curves and a distortion curve of the image capturing apparatus according to the 7th embodiment. In FIG. 13, the image capturing apparatus includes the imaging optical lens system (its reference numeral is omitted) and an image sensor 790. The imaging optical lens system includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image surface 780. The image sensor 790 is disposed on the image surface 780 of the imaging optical lens system. There is an air gap and no relative movement between every two of the first lens element 710, the second lens element 720, the third lens element 730, the fourth lens element 740, the fifth lens element 750 and the sixth lens element 760 that are adjacent to each other. The imaging optical lens system includes six lens elements (710-760) without additional one or more lens elements inserted between the first lens element 710 and the sixth lens element 760.

The first lens element 710 with positive refractive power has an object-side surface 711 being convex in a paraxial region thereof and an image-side surface 712 being convex in a paraxial region thereof. The first lens element 710 is made of a plastic material, and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of a plastic material, and has the object-side surface 721 and the image-side surface 722 being both aspheric.

The third lens element 730 with negative refractive power has an object-side surface 731 being concave in a paraxial region thereof and an image-side surface 732 being concave in a paraxial region thereof. The third lens element 730 is made of a plastic material, and has the object-side surface 731 and the image-side surface 732 being both aspheric. Furthermore, the image-side surface 732 of the third lens element 730 includes at least one convex shape in an off-axial region thereof.

The fourth lens element 740 with positive refractive power has an object-side surface 741 being concave in a paraxial region thereof and an image-side surface 742 being convex in a paraxial region thereof. The fourth lens element 740 is made of a plastic material, and has the object-side surface 741 and the image-side surface 742 being both aspheric.

The fifth lens element 750 with positive refractive power has an object-side surface 751 being convex in a paraxial region thereof and an image-side surface 752 being concave in a paraxial region thereof. The fifth lens element 750 is made of a plastic material, and has the object-side surface 751 and the image-side surface 752 being both aspheric. Furthermore, the image-side surface 752 of the fifth lens element 750 includes at least one convex critical point in an off-axial region thereof.

The sixth lens element 760 with negative refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, the image-side surface 762 of the sixth lens element 760 includes at least one convex critical point in an off-axial region thereof.

The IR-cut filter 770 is made of a glass material and located between the sixth lens element 760 and the image surface 780, and will not affect the focal length of the imaging optical lens system.

The detailed optical data of the 7th embodiment are shown in TABLE 13 and the aspheric surface data are shown in TABLE 14 below.

TABLE 13

7th Embodiment
f = 3.67 mm, Fno = 2.05, HFOV = 41.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.132 | | | | |
| 2 | Lens 1 | 2.430 | ASP | 0.528 | Plastic | 1.545 | 56.0 | 3.76 |
| 3 | | −12.019 | ASP | 0.060 | | | | |
| 4 | Lens 2 | −50.998 | ASP | 0.232 | Plastic | 1.671 | 19.5 | −17.08 |
| 5 | | 14.806 | ASP | 0.518 | | | | |
| 6 | Lens 3 | −81.930 | ASP | 0.245 | Plastic | 1.671 | 19.5 | −9.65 |
| 7 | | 7.034 | ASP | 0.047 | | | | |
| 8 | Lens 4 | −8.288 | ASP | 0.823 | Plastic | 1.544 | 55.9 | 27.91 |
| 9 | | −5.548 | ASP | 0.044 | | | | |
| 10 | Lens 5 | 1.674 | ASP | 0.400 | Plastic | 1.544 | 55.9 | 4.14 |
| 11 | | 5.970 | ASP | 0.597 | | | | |
| 12 | Lens 6 | 1.895 | ASP | 0.377 | Plastic | 1.544 | 55.9 | −3.98 |
| 13 | | 0.939 | ASP | 0.500 | | | | |
| 14 | IR-cut filter | Plano | | 0.300 | Glass | 1.517 | 64.2 | — |
| 15 | | Plano | | 0.332 | | | | |
| 16 | Image | Plano | | — | | | | |

Reference wavelength is 587.6 nm (d-line).

TABLE 14

Aspheric Coefficients

| | Surface # | | | | |
|---|---|---|---|---|---|
| 2 | 3 | 4 | 5 | 6 | 7 |
| k = −1.1155E+00 | −4.7243E+01 | 7.3875E+01 | −7.3227E+01 | 9.0000E+01 | 2.2635E+01 |
| A4 = −1.6657E−02 | −1.3906E−01 | −1.7668E−01 | −1.2555E−01 | −3.3319E−01 | −2.5915E−01 |
| A6 = −1.1859E−02 | 2.6325E−01 | 4.0673E−01 | 1.4886E−01 | 5.3696E−02 | 2.9475E−02 |
| A8 = −3.1430E−02 | −3.0029E−01 | −4.9964E−01 | −1.7672E−01 | 9.8471E−02 | 2.5566E−01 |
| A10 = 6.1536E−02 | 1.3885E−01 | 2.4040E−01 | 2.8455E−02 | −3.1110E−02 | −3.9821E−01 |
| A12 = −6.7283E−02 | −7.5415E−02 | −6.3936E−02 | −5.3540E−04 | | 3.4761E−01 |

TABLE 14-continued

| Aspheric Coefficients | | | | | |
|---|---|---|---|---|---|
| A14 = | 1.6876E−02 | 1.7810E−02 | −3.4794E−02 | | −1.4989E−01 |
| A16 = | | | | | 2.4176E−02 |

| | Surface # | | | | |
|---|---|---|---|---|---|
| | 8 | 9 | 10 | 11 | 12 | 13 |
| k = | −4.3993E+01 | 7.3715E+00 | −9.6041E+00 | 4.1295E+00 | −4.4084E−01 | −3.4853E+00 |
| A4 = | 3.1290E−02 | −2.9381E−01 | 1.3485E−01 | 3.1327E−01 | −3.8979E−01 | −1.8172E−01 |
| A6 = | 2.9494E−02 | 3.6893E−01 | −1.5391E−01 | −3.9130E−01 | 2.1273E−01 | 1.0610E−01 |
| A8 = | −7.0898E−02 | −2.8121E−01 | 6.1743E−02 | 2.4029E−01 | −1.1162E−01 | −4.6556E−02 |
| A10 = | 4.4661E−02 | 1.3051E−01 | −1.5837E−02 | −9.5948E−02 | 4.3363E−02 | 1.3199E−02 |
| A12 = | −8.6921E−03 | −3.6162E−02 | 1.1798E−03 | 2.3631E−02 | −9.9461E−03 | −2.1957E−03 |
| A14 = | | 4.7152E−03 | 1.6447E−04 | −3.1427E−03 | 1.2082E−03 | 1.9377E−04 |
| A16 = | | | | 1.7025E−04 | −6.1233E−05 | −7.0011E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f (mm) | 3.67 | BL/T23 | 2.19 |
| Fno | 2.05 | TL/ImgH | 1.53 |
| HFOV (deg.) | 41.0 | (|Sag21| + |Sag22|)/ | 1.17 |
| EPDmin/EPDmax | 1.00 | CT2 | |
| (R3 + R4)/(R3 − R4) | 0.55 | f/T23 | 7.08 |
| f/|R4| | 0.25 | V2 + V3 | 39.0 |
| T23/(CT2 + CT3) | 1.09 | YV6R2/YV5R2 | 0.97 |
| CT6/T56 | 0.63 | YV6R2/EPDmax | 0.74 |

Furthermore, in the imaging optical lens system according to the 7th embodiment, when a focal length of the first lens element 710 is f1, a focal length of the second lens element 720 is f2, a focal length of the third lens element 730 is f3, a focal length of the fourth lens element 740 is f4, a focal length of the fifth lens element 750 is f5, and a focal length of the sixth lens element 760 is f6, the following conditions are satisfied: |f1|<|f2|; |f1|<|f3|; |f1|<|f4|; |f1|<|f5|; and |f1|<|f6|.

8th Embodiment

Figure 15:
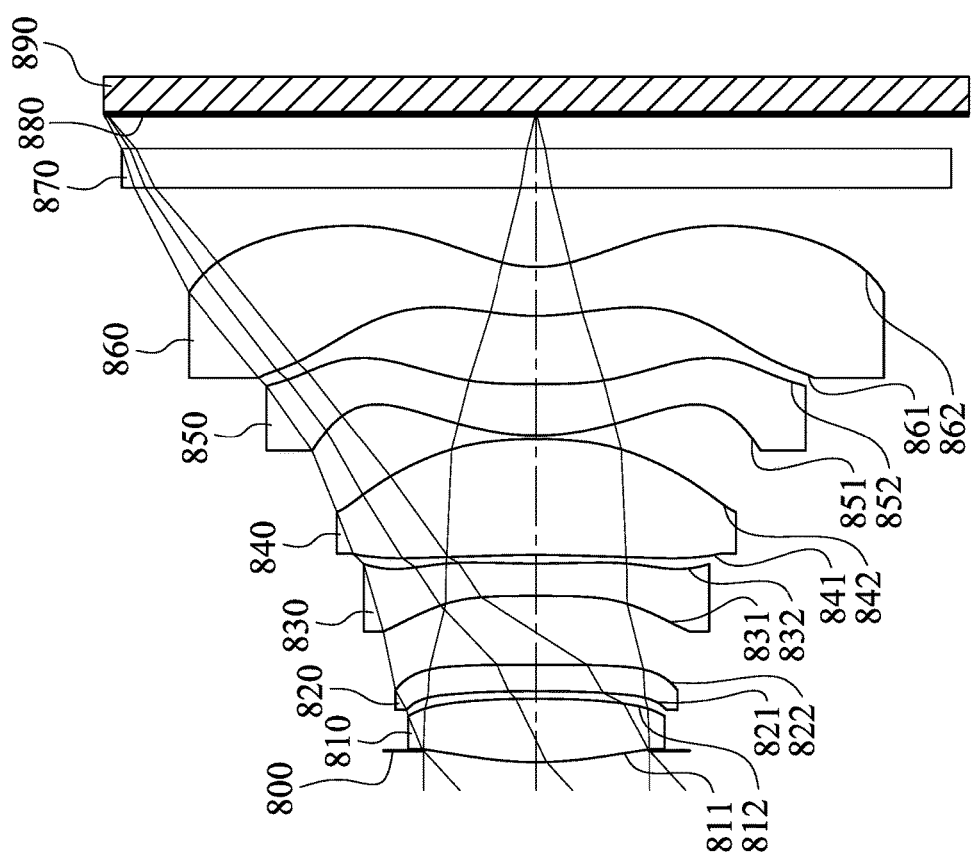
FIG. 15 is a schematic view of an image capturing apparatus according to the 8th embodiment of the present disclosure.
Figure 16:
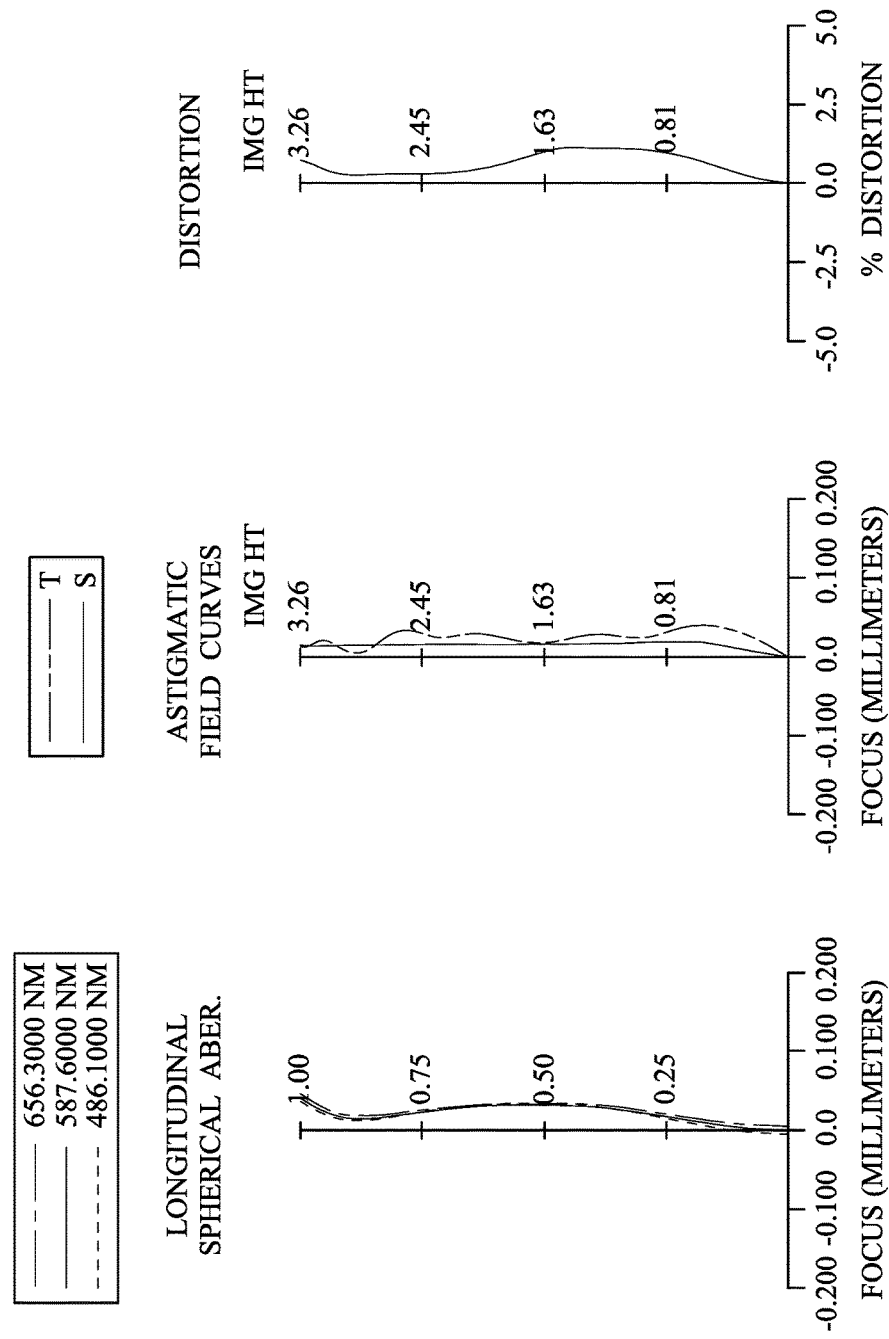
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows, in order from left to right, spherical aberration curves, astigmatic field curves and a distortion curve of the image capturing apparatus according to the 8th embodiment. In FIG. 15, the image capturing apparatus includes the imaging optical lens system (its reference numeral is omitted) and an image sensor 890. The imaging optical lens system includes, in order from an object side to an image side, an aperture stop 800, a first lens element 810, a second lens element 820, a third lens element 830, a fourth lens element 840, a fifth lens element 850, a sixth lens element 860, an IR-cut filter 870 and an image surface 880. The image sensor 890 is disposed on the image surface 880 of the imaging optical lens system. There is an air gap and no relative movement between every two of the first lens element 810, the second lens element 820, the third lens element 830, the fourth lens element 840, the fifth lens element 850 and the sixth lens element 860 that are adjacent to each other. The imaging optical lens system includes six lens elements (810-860) without additional one or more lens elements inserted between the first lens element 810 and the sixth lens element 860.

The first lens element 810 with positive refractive power has an object-side surface 811 being convex in a paraxial region thereof and an image-side surface 812 being convex in a paraxial region thereof. The first lens element 810 is made of a glass material, and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of a plastic material, and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric. Furthermore, the image-side surface 832 of the third lens element 830 includes at least one convex shape in an off-axial region thereof.

The fourth lens element 840 with positive refractive power has an object-side surface 841 being concave in a paraxial region thereof and an image-side surface 842 being convex in a paraxial region thereof. The fourth lens element 840 is made of a plastic material, and has the object-side surface 841 and the image-side surface 842 being both aspheric.

The fifth lens element 850 with positive refractive power has an object-side surface 851 being convex in a paraxial region thereof and an image-side surface 852 being concave in a paraxial region thereof. The fifth lens element 850 is made of a plastic material, and has the object-side surface 851 and the image-side surface 852 being both aspheric. Furthermore, the image-side surface 852 of the fifth lens element 850 includes at least one convex critical point in an off-axial region thereof.

The sixth lens element 860 with negative refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric. Furthermore, the image-side surface 862 of the sixth lens element 860 includes at least one convex critical point in an off-axial region thereof.

The IR-cut filter 870 is made of a glass material and located between the sixth lens element 860 and the image surface 880, and will not affect the focal length of the imaging optical lens system.

The detailed optical data of the 8th embodiment are shown in TABLE 15 and the aspheric surface data are shown in TABLE 16 below.

TABLE 15

8th Embodiment f = 3.51 mm, Fno = 2.05, HFOV = 42.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.086 | | | | |
| 2 | Lens 1 | 2.871 | ASP | 0.484 | Glass | 1.610 | 57.9 | 3.82 |
| 3 | | −11.621 | ASP | 0.057 | | | | |
| 4 | Lens 2 | −21.272 | ASP | 0.200 | Plastic | 1.671 | 19.5 | −24.89 |
| 5 | | 77.898 | ASP | 0.522 | | | | |
| 6 | Lens 3 | 190.603 | ASP | 0.245 | Plastic | 1.671 | 19.5 | −8.46 |
| 7 | | 5.506 | ASP | 0.066 | | | | |
| 8 | Lens 4 | −8.805 | ASP | 0.877 | Plastic | 1.544 | 55.9 | 17.41 |
| 9 | | −4.721 | ASP | 0.032 | | | | |
| 10 | Lens 5 | 1.842 | ASP | 0.388 | Plastic | 1.544 | 55.9 | 3.97 |
| 11 | | 11.571 | ASP | 0.518 | | | | |
| 12 | Lens 6 | 1.863 | ASP | 0.370 | Plastic | 1.544 | 55.9 | −3.79 |
| 13 | | 0.910 | ASP | 0.600 | | | | |
| 14 | IR-cut filter | Plano | | 0.300 | Glass | 1.517 | 64.2 | — |
| 15 | | Plano | | 0.263 | | | | |
| 16 | Image | Plano | | — | | | | |

Reference wavelength is 587.6 nm (d-line).

TABLE 16

Aspheric Coefficients

| Surface # | | | | | |
|---|---|---|---|---|---|
| 2 | 3 | 4 | 5 | 6 | 7 |

| | 2 | 3 | 4 | 5 | 6 | 7 |
|---|---|---|---|---|---|---|
| k = | −2.4094E+00 | 4.6894E+01 | 1.7948E+01 | −9.0000E+01 | 9.0000E+01 | 1.3906E+01 |
| A4 = | −2.6440E−02 | −1.4218E−01 | −1.7111E−01 | −1.1567E−01 | −3.3149E−01 | −2.5562E−01 |
| A6 = | −1.7260E−02 | 2.3701E−01 | 4.0891E−01 | 1.6032E−01 | 1.1500E−01 | 6.6032E−02 |
| A8 = | −5.1293E−02 | −2.8125E−01 | −4.9269E−01 | −2.0360E−01 | 4.0360E−02 | 1.7449E−01 |
| A10 = | 7.2763E−02 | 1.4577E−01 | 2.2359E−01 | 4.5728E−02 | −1.9002E−02 | −2.9576E−01 |
| A12 = | −4.6398E−02 | −8.1082E−02 | −6.7685E−02 | −1.3027E−02 | | 2.6339E−01 |
| A14 = | −4.7593E−03 | 1.7923E−02 | −3.5625E−02 | | | −1.1528E−01 |
| A16 = | | | | | | 1.8698E−02 |

| | Surface # | | | | | |
|---|---|---|---|---|---|---|
| | 8 | 9 | 10 | 11 | 12 | 13 |
| k = | −4.6719E+01 | 6.9324E+00 | −1.3250E+01 | 1.0275E+01 | −4.6558E−01 | −3.2789E+00 |
| A4 = | 3.9652E−02 | −3.1190E−01 | 1.3878E−01 | 3.4791E−01 | −3.6756E−01 | −1.8072E−01 |
| A6 = | 9.4841E−04 | 4.1072E−01 | −1.5304E−01 | −4.2095E−01 | 2.0120E−01 | 1.0831E−01 |
| A8 = | −4.0234E−02 | −3.2277E−01 | 6.2262E−02 | 2.6229E−01 | −1.0463E−01 | −4.7100E−02 |
| A10 = | 3.2568E−02 | 1.5704E−01 | −1.6259E−02 | −1.0612E−01 | 4.0250E−02 | 1.3186E−02 |
| A12 = | −7.1785E−03 | −4.5028E−02 | 1.1439E−03 | 2.6145E−02 | −9.4249E−03 | −2.1851E−03 |
| A14 = | | 5.9616E−03 | 1.9250E−04 | −3.4465E−03 | 1.2022E−03 | 1.9357E−04 |
| A16 = | | | 1.8441E−04 | | −6.5139E−05 | −7.0721E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | | | |
|---|---|---|---|
| f (mm) | 3.51 | BL/T23 | 2.23 |
| Fno | 2.08 | TL/ImgH | 1.51 |
| HFOV (deg.) | 42.5 | (|Sag21| + |Sag22|)/ | 1.36 |
| EPDmin/EPDmax | 1.00 | CT2 | |
| (R3 + R4)/(R3 − R4) | −0.57 | f/T23 | 6.72 |
| f/|R4| | 0.05 | V2 + V3 | 39.0 |
| T23/(CT2 + CT3) | 1.17 | YV6R2/YV5R2 | 1.07 |
| CT6/T56 | 0.71 | YV6R2/EPDmax | 0.83 |

9th Embodiment

Figure 17:
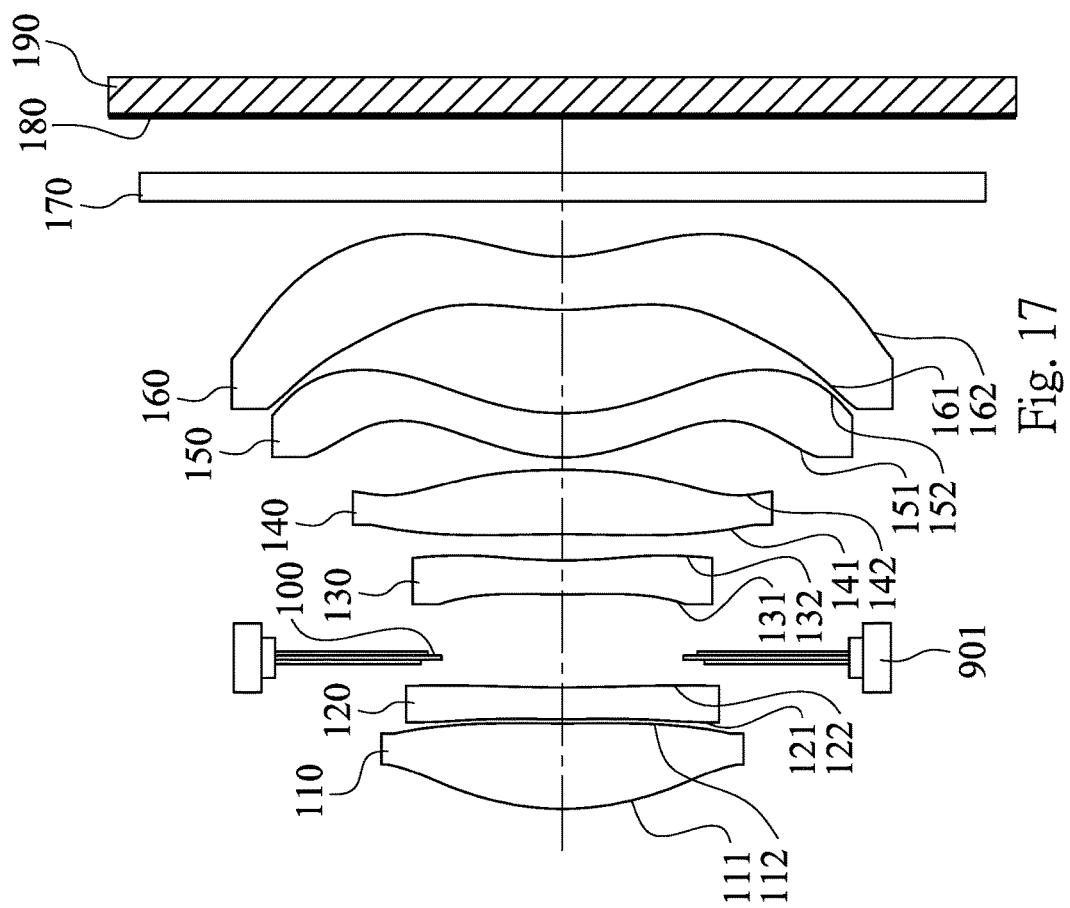
FIG. 17 is a schematic view of an image capturing apparatus according to the 9th embodiment of the present disclosure.

FIG. 17 is a schematic view of an image capturing apparatus according to the 9th embodiment of the present disclosure. In FIG. 17, the image capturing apparatus of the 9th embodiment includes an imaging optical lens system (its reference numeral is omitted) and the image sensor 190 of the image capturing apparatus according to the 1st embodiment. The imaging optical lens system of the 9th embodiment includes the first lens element 110, the second lens element 120, the third lens element 130, the fourth lens element 140, the fifth lens element 150, the sixth lens element 160, the IR-cut filter 170, the image surface 180 and the aperture stop 100 of the 1st embodiment, and an aperture adjustment unit 901. The aperture adjustment unit 901 can be a mechanical aperture adjustment unit, an electronic aperture adjustment unit or a liquid crystal aperture adjustment unit.

In the imaging optical lens system according to the 9th embodiment, the aperture adjustment unit 901 is for adjusting the size of the aperture stop 100. The aperture stop 100 is the adjustable stop controlled by the aperture adjustment unit 901, so that an effective radius of the aperture stop 100 and an f-number of the image capturing apparatus can be changed. The value of the parameter Fno in the 9th embodiment can be adjusted to 1.90 (corresponding to FIG. 1B), 2.00 (corresponding to FIG. 1A) and 4.00 (corresponding to FIG. 1C). Furthermore, the aperture stop 100 and the aperture adjustment unit 901 are both disposed between the second lens element 120 and the third lens element 130.

In the imaging optical lens system according to the 9th embodiment, shutters, MEMS, filters, spacers and so on, but not limited thereto, can be further accommodated between the second lens element 120 and the third lens element 130.

In other embodiments (not shown herein), an image capturing apparatus includes an imaging optical lens system, wherein the imaging optical lens system can have a total of seven, eight or more lens elements and includes an aperture adjustment unit. Furthermore, a first lens element is the closest lens element to an object side of the imaging optical lens system of all lens elements. When an axial distance between an object-side surface of the first lens element and an image surface is TL, and a maximum image height of the imaging optical lens system is ImgH, the following condition is satisfied: TL/ImgH<1.80. When a minimum entrance pupil diameter of the imaging optical lens system is EPDmin, and a maximum entrance pupil diameter of the imaging optical lens system is EPDmax, the following condition is satisfied: 0<EPDmin/EPDmax<0.75.

10th Embodiment

Figure 19:
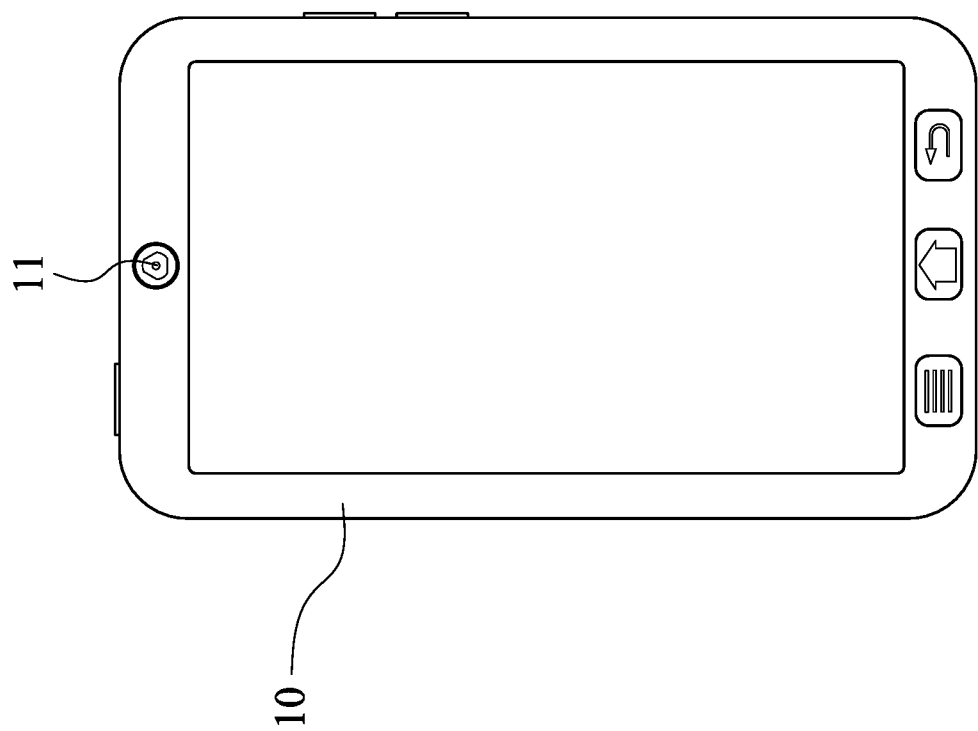
FIG. 19 shows an electronic device according to the 10th embodiment of the present disclosure.

FIG. 19 shows an electronic device 10 according to the 10th embodiment of the present disclosure. The electronic device 10 of the 10th embodiment is a smartphone, wherein the electronic device 10 includes an image capturing apparatus 11. The image capturing apparatus 11 includes an imaging optical lens system (its reference numeral is omitted) according to the present disclosure and an image sensor (its reference numeral is omitted), wherein the image sensor is disposed on an image surface of the imaging optical lens system.

11th Embodiment

Figure 20:
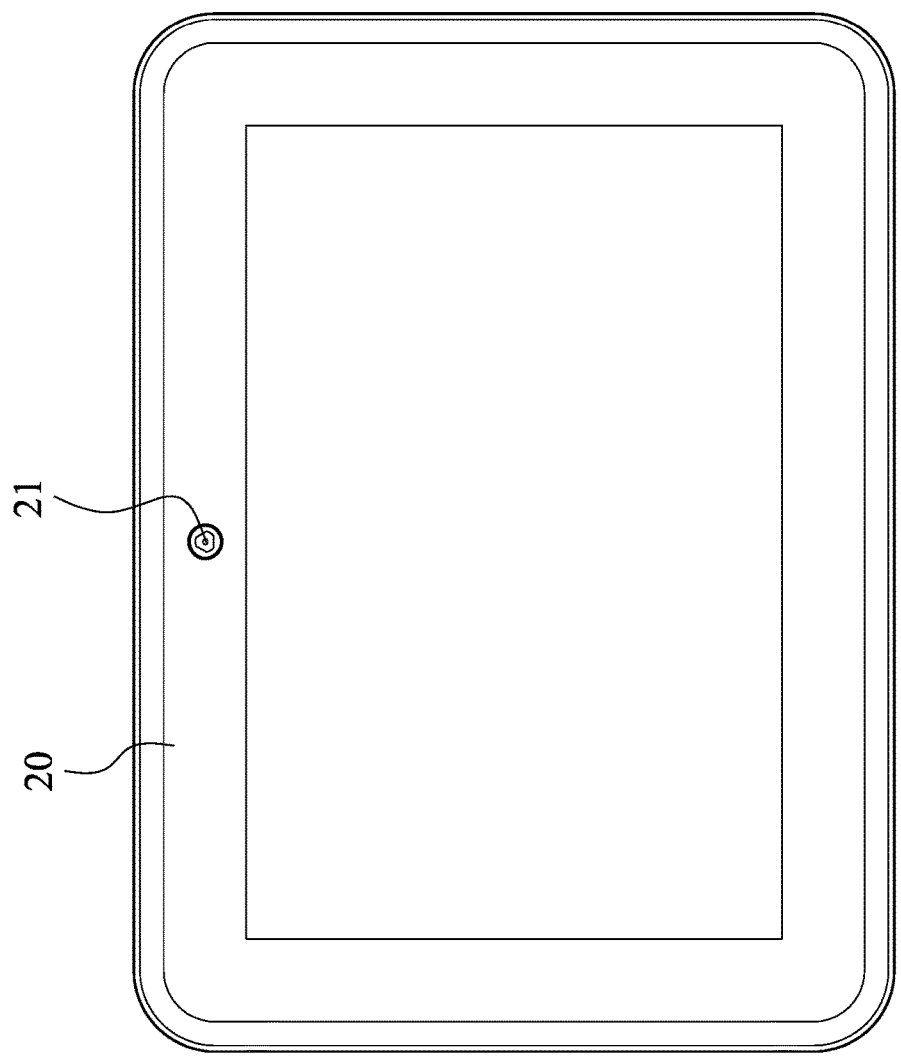
FIG. 20 shows an electronic device according to the 11th embodiment of the present disclosure.

FIG. 20 shows an electronic device 20 according to the 11th embodiment of the present disclosure. The electronic device 20 of the 11th embodiment is a tablet personal computer, wherein the electronic device 20 includes an image capturing apparatus 21. The image capturing apparatus 21 includes an imaging optical lens system (its reference numeral is omitted) according to the present disclosure and an image sensor (its reference numeral is omitted), wherein the image sensor is disposed on an image surface of the imaging optical lens system.

12th Embodiment

Figure 21:
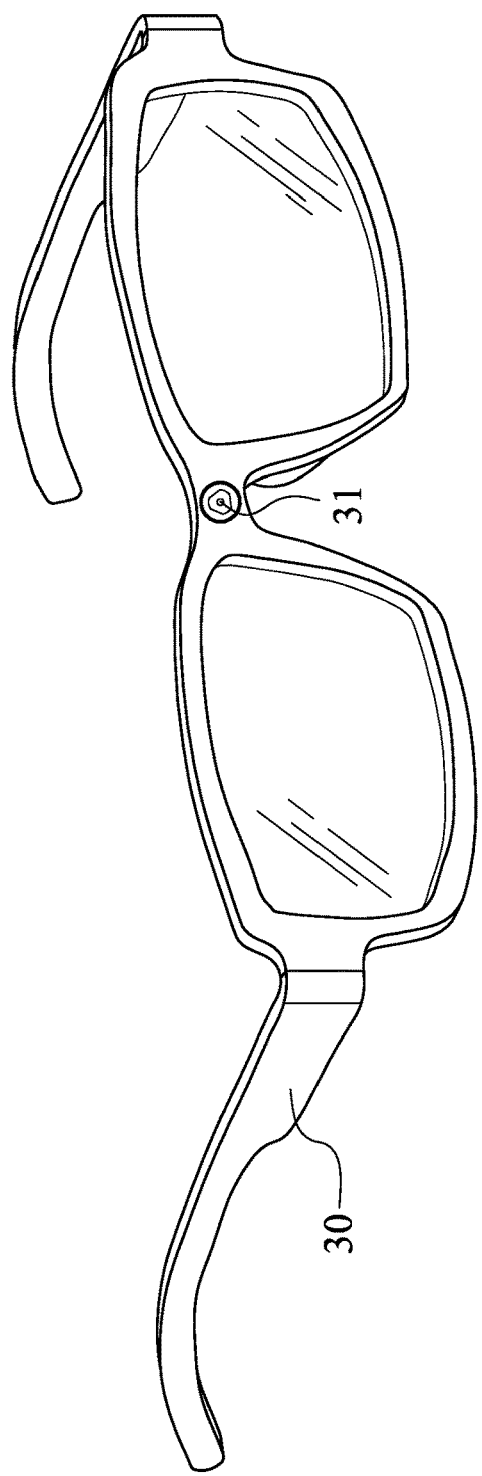
FIG. 21 shows an electronic device according to the 12th embodiment of the present disclosure.

FIG. 21 shows an electronic device 30 according to the 12th embodiment of the present disclosure. The electronic device 30 of the 12th embodiment is a wearable device, wherein the electronic device 30 includes an image capturing apparatus 31. The image capturing apparatus 31 includes an imaging optical lens system (its reference numeral is omitted) according to the present disclosure and an image sensor (its reference numeral is omitted), wherein the image sensor is disposed on an image surface of the imaging optical lens system.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing apparatus, comprising an imaging optical lens system;
   wherein the imaging optical lens system comprises at least six lens elements, an aperture stop, and an adjusting member, the adjusting member is for adjusting an effective radius of the aperture stop;

wherein the at least six lens elements, in order from an object side facing toward an imaged object to an image side facing toward an image surface, comprises a first lens element, a second lens element, a third lens element, and a last lens element;

wherein the last lens element is the lens element of the at least six lens elements closest to the image surface, and the last lens element has an image-side surface being concave in a paraxial region thereof and comprising at least one convex critical point in an off-axis region thereof;

wherein an axial distance between an object-side surface of the first lens element and the image surface is TL, a maximum image height of the imaging optical lens system is ImgH, a minimum entrance pupil diameter of the imaging optical lens system is EPDmin, a maximum entrance pupil diameter of the imaging optical lens system is EPDmax, and the following conditions are satisfied:

$TL/ImgH<1.80$; and $0<EPDmin/EPDmax<0.75$.

2. The image capturing apparatus of claim 1, wherein the adjusting member is located between the second lens element and the third lens element.

3. The image capturing apparatus of claim 2, wherein an axial distance between the second lens element and the third lens element is T23, a central thickness of the second lens element is CT2, a central thickness of the third lens element is CT3, and the following condition is satisfied:

$1.0<T23/(CT2+CT3)$.

4. The image capturing apparatus of claim 2, wherein a displacement in parallel with an optical axis from an axial vertex on an object-side surface of the second lens element to a maximum effective radius position on the object-side surface of the second lens element is Sag21, a displacement in parallel with the optical axis from an axial vertex on an image-side surface of the second lens element to a maximum effective radius position on the image-side surface of the second lens element is Sag22, a central thickness of the second lens element is CT2, and the following condition is satisfied:

$0<(|Sag21|+|Sag22|)/CT2<1.0$.

5. The image capturing apparatus of claim 1, wherein an Abbe number of the second lens element is V2, an Abbe number of the third lens element is V3, and the following condition is satisfied:

$30<V2+V3<60$.

6. The image capturing apparatus of claim 1, wherein the minimum entrance pupil diameter of the imaging optical lens system is EPDmin, the maximum entrance pupil diameter of the imaging optical lens system is EPDmax, and the following condition is satisfied:

$0<EPDmin/EPDmax\leq0.60$.

7. The image capturing apparatus of claim 1, wherein the axial distance between the object-side surface of the first lens element and the image surface is TL, the maximum image height of the imaging optical lens system is ImgH, and the following condition is satisfied:

$TL/ImgH\leq1.58$.

8. The image capturing apparatus of claim 1, wherein a total number of lens elements in the imaging optical lens system is six.

9. The image capturing apparatus of claim 1, wherein a total number of lens elements in the imaging optical lens system is seven.

10. The image capturing apparatus of claim 9, wherein there is no relative movement between every adjacent lens elements of the seven lens elements.

11. The image capturing apparatus of claim 1, wherein a total number of lens elements in the imaging optical lens system is eight.

12. The image capturing apparatus of claim 11, wherein there is no relative movement between every adjacent lens elements of the eight lens elements.

13. The image capturing apparatus of claim 1, wherein the first lens element with positive refractive power has the object-side surface being convex in a paraxial region thereof.

14. The image capturing apparatus of claim 1, wherein the second lens element has positive refractive power.

15. The image capturing apparatus of claim 1, wherein the third lens element has negative refractive power.

16. The image capturing apparatus of claim 1, wherein there is no relative movement between every adjacent lens elements of the at least six lens elements.

17. The image capturing apparatus of claim 1, wherein each of the at least six lens elements is made of a plastic material.

18. An image capturing apparatus, comprising an imaging optical lens system;

wherein the imaging optical lens system comprises at least six lens elements, an aperture stop, and an adjusting member, the adjusting member is for adjusting an effective radius of the aperture stop;

wherein the at least six lens elements, in order from an object side facing toward an imaged object to an image side facing toward an image surface, comprises a first lens element, a second lens element, a third lens element, and there is no relative movement between every adjacent lens elements of the at least six lens elements;

wherein an axial distance between an object-side surface of the first lens element and the image surface is TL, a maximum image height of the imaging optical lens system is ImgH, a minimum entrance pupil diameter of the imaging optical lens system is EPDmin, a maximum entrance pupil diameter of the imaging optical lens system is EPDmax, and the following conditions are satisfied:

$TL/ImgH<1.80$; and $0<EPDmin/EPDmax<0.75$.

19. The image capturing apparatus of claim 18, wherein the first lens element with positive refractive power has the object-side surface being convex in a paraxial region thereof.

20. The image capturing apparatus of claim 18, wherein the second lens element has positive refractive power.

21. The image capturing apparatus of claim 18, wherein the axial distance between the object-side surface of the first lens element and the image surface is TL, the maximum image height of the imaging optical lens system is ImgH, and the following condition is satisfied:

$TL/ImgH\leq1.58$.

22. The image capturing apparatus of claim 18, wherein the minimum entrance pupil diameter of the imaging optical lens system is EPDmin, the maximum entrance pupil diameter of the imaging optical lens system is EPDmax, and the following condition is satisfied:

$0 < EPD\text{min}/EPD\text{max} \leq 0.60$.

23. The image capturing apparatus of claim 18, wherein the adjusting member is located between the second lens element and the third lens element.

24. The image capturing apparatus of claim 18, wherein the imaging optical lens system comprises at least seven lens elements.

25. The image capturing apparatus of claim 18, wherein each of the at least six lens elements is made of a plastic material.

* * * * *